(12) United States Patent
Murayama et al.

(10) Patent No.: US 10,545,241 B2
(45) Date of Patent: Jan. 28, 2020

(54) POSITION DETECTING APPARATUS AND MEASURING METHOD

(71) Applicant: Funai Electric Co., Ltd., Osaka (JP)

(72) Inventors: Manabu Murayama, Itami (JP); Yuichiro Masuda, Takatsuki (JP); Tomohisa Hirai, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 518 days.

(21) Appl. No.: 15/285,562

(22) Filed: Oct. 5, 2016

(65) Prior Publication Data
US 2017/0097419 A1    Apr. 6, 2017

(30) Foreign Application Priority Data
Oct. 5, 2015  (JP) .................................. 2015-197943

(51) Int. Cl.
| | |
|---|---|
| G01S 17/00 | (2006.01) |
| G01S 17/36 | (2006.01) |
| G01S 17/42 | (2006.01) |
| G01S 7/481 | (2006.01) |
| G02B 26/10 | (2006.01) |
| G02B 27/14 | (2006.01) |

(52) U.S. Cl.
CPC ............ *G01S 17/36* (2013.01); *G01S 7/4813* (2013.01); *G01S 7/4817* (2013.01); *G01S 17/42* (2013.01); *G02B 26/105* (2013.01); *G02B 27/144* (2013.01)

(58) Field of Classification Search
USPC .............................................. 356/4.01, 5.01
See application file for complete search history.

(56) References Cited

U.S. PATENT DOCUMENTS

| | | | |
|---|---|---|---|
| 4,916,536 A | 4/1990 | Kerr et al. | |
| 8,035,875 B2 * | 10/2011 | Shigematsu | ............ G01S 17/42 |
| | | | 359/199.3 |
| 2008/0007710 A1 * | 1/2008 | Zambon | .................. G01S 7/481 |
| | | | 356/5.01 |

(Continued)

FOREIGN PATENT DOCUMENTS

| | | |
|---|---|---|
| JP | H08-271822 A | 10/1996 |
| JP | H10-300851 A | 11/1998 |

(Continued)

OTHER PUBLICATIONS

Office Action issued in Chinese Application No. 201610881033.0, dated Sep. 3, 2018 (7 pages).

(Continued)

*Primary Examiner* — James R Hulka
(74) *Attorney, Agent, or Firm* — Osha Liang LLP

(57) ABSTRACT

A position detecting apparatus includes a light-transmitting mirror that pivots around a pivot shaft and reflects measuring light from a light source; a light-receiving mirror that pivots around the pivot shaft and reflects returning light from an object; and a light-receiving element that receives the returning light from the light-receiving mirror. When the light-transmitting mirror and the light-receiving mirror are at rest, a first mirror angle between a mirror surface of the light-receiving mirror and a direction from the pivot shaft to the light-receiving element is larger than a second mirror angle between a mirror surface of the light-transmitting mirror and the direction.

17 Claims, 23 Drawing Sheets

(56) References Cited

U.S. PATENT DOCUMENTS

| | | | |
|---|---|---|---|
| 2008/0018879 A1* | 1/2008 | Kim | G01S 7/003 |
| | | | 356/4.01 |
| 2008/0231831 A1* | 9/2008 | Masuda | G01S 7/493 |
| | | | 356/5.1 |
| 2010/0103427 A1 | 4/2010 | Shigematsu et al. | |
| 2013/0077083 A1* | 3/2013 | Suzuki | G01S 7/4817 |
| | | | 356/4.01 |
| 2014/0165736 A1* | 6/2014 | Paul | G01M 11/081 |
| | | | 73/760 |

FOREIGN PATENT DOCUMENTS

| | | |
|---|---|---|
| JP | 2011-099816 A | 5/2011 |
| JP | 2013-210315 A | 10/2013 |
| JP | 2014-059222 A | 4/2014 |
| WO | 2008/149851 A1 | 12/2008 |

OTHER PUBLICATIONS

Extended European Search Report issued in corresponding European Application No. 16192318.0 dated Feb. 17, 2017 (8 pages).
Notice of Reasons for Refusal issued in Japanese Application No. 2015-197943, dated Sep. 24, 2019 (5 pages).

* cited by examiner

POSITION DETECTING APPARATUS AND MEASURING METHOD

TECHNICAL FIELD

The present invention generally relates to a position detecting apparatus and a measuring method for measuring a distance to an object.

BACKGROUND ART

Conventionally, there are measuring apparatuses that use a movable mirror to emit a laser light in a plurality of directions and receive the laser light, which is reflected by an object, via the movable mirror (for example, see patent literature 1).

CITATION LIST

Patent Literature

[Patent Literature 1] WO 2008/149851

However, with the conventional measuring apparatuses above, the amount of returning light from the object that reaches a light-receiving element changes according to a tilt of the movable mirror. As a result, uniformity of ranging precision is impaired by an SN (signal/noise) ratio in the light-receiving element changing depending on a direction of the object.

SUMMARY OF THE INVENTION

According to one or more embodiments of the present invention, a measuring apparatus (position detecting apparatus) may increase uniformity of ranging precision of a direction of an object.

According to one or more embodiments of the present invention, a measuring apparatus may comprise a light-transmitting mirror that pivots being supported by a pivot shaft and reflects a measuring light from a light source; and a light-receiving mirror that pivots being supported by the pivot shaft, has a predetermined mirror width in a direction perpendicular to the pivot shaft, and reflects a returning light from an object. With a projection dimension in a light-receiving-element direction of the mirror width as an opening width, when the light-transmitting mirror and the light-receiving mirror are at rest, the light-receiving mirror reflects a light incident in a parallel manner to the measuring light emitted from the light-transmitting mirror from a direction of the light-receiving element to a direction tilted in a rotational direction in which the opening width increases.

The projection dimension in the light-receiving-optical-axis direction of the mirror width differs according to a tilt of the light-receiving mirror. As a result, a light-receiving strength of the light at the light-receiving element varies according to the projection dimension. Variation in the light-receiving strength inhibits uniformity of ranging precision according to a direction of the object.

Furthermore, in a situation where a pivot amplitude of the light-transmitting mirror and a pivot amplitude of the light-receiving mirror differ, a condensing point of the light heading from the light-receiving mirror to the light-receiving element varies in a pivot period. As a result, periodic light-receiving loss due to a shift between the condensing point of the light and the light-receiving element arises, and uniformity of ranging precision according to the direction of the object is inhibited.

In contrast thereto, according to one or more embodiments of the present invention, when the light-transmitting mirror and the light-receiving mirror are at rest, an optical axis of the light heading from the light-receiving mirror to the light-receiving element tilts from the direction of the light-receiving element to the rotational direction in which the opening width of the light-receiving mirror increases.

According to this configuration, a tilt position of the light-receiving mirror where the light-receiving loss due to the optical-axis shift approaches, of two ends of the pivot range of the light-receiving mirror, a small-opening end where the opening width is smaller. As a result, the light-receiving loss due to the optical-axis shift at the small-opening end decreases, shrinking of the opening width and the light-receiving loss due to the optical-axis shift synergize, and an inconvenience of the light-receiving strength decreasing excessively is mitigated. Moreover, of the two ends of the pivot range of the light-receiving mirror, at a large-opening end where the opening width appears wider, because the light-receiving loss due to the optical-axis shift conversely increases, an inconvenience of the light-receiving strength increasing excessively is mitigated.

Thus, by variation in the light-receiving strength being suppressed, uniformity of ranging precision of the direction of the object improves.

Furthermore, according to one or more embodiments of the present invention, while the light-transmitting mirror and the light-receiving mirror pivot, the light-receiving mirror, in a position tilted from a pivot center to a rotational direction in which the opening width decreases, may reflect the light incident in the parallel manner to the measuring light emitted from the light-transmitting mirror in the direction of the light-receiving element.

According to this configuration, at the small-opening end, a shift amount between an optical axis of the light, heading from the light-receiving mirror to the light-receiving element, and an optical axis of the light-receiving element shrinks a certain extent. As a result, uniformity of ranging precision of the direction of the object is improved a certain extent.

Furthermore, according to one or more embodiments of the present invention, the light-receiving mirror, at a pivot end in the rotational direction in which the opening width decreases, may reflect the light incident in the parallel manner to the measuring light emitted from the light-transmitting mirror in the direction of the light-receiving element.

According to this configuration, at the small-opening end, reduction of the light-receiving strength due to a shift between the optical axis of the light and the optical axis of the light-receiving element is eliminated; therefore, uniformity of ranging precision of the direction of the object improves.

Furthermore, according to one or more embodiments of the present invention, the light-receiving element and the light source may be disposed around the pivot shaft in the same direction and, when the light-transmitting mirror and the light-receiving mirror are at rest, a mirror surface of the light-receiving mirror may be tilted from a mirror surface of the light-transmitting mirror to the rotational direction in which the opening width increases.

According to this configuration, at the small-opening end, a shift amount between an optical axis of the returning light, heading from the light-receiving mirror to the light-receiving element, and the optical axis of the light-receiving element shrinks a certain extent. As a result, uniformity of ranging precision of the direction of the object is improved a certain extent.

Furthermore, according to one or more embodiments of the present invention, the mirror surface of the light-receiving mirror may be tilted from the mirror surface of the light-transmitting mirror by an angle equal to a half amount of the difference between the pivot amplitude of the light-receiving mirror and the pivot amplitude of the light-transmitting mirror.

According to this configuration, at the small-opening end, reduction of the light-receiving strength due to the shift between the optical axis of the light and the optical axis of the light-receiving element is eliminated; therefore, uniformity of ranging precision of the direction of the object improves.

Furthermore, according to one or more embodiments of the present invention, the light source may be disposed around the pivot shaft tilted from the direction of the light-receiving element to the rotational direction in which the opening width increases and, when the light-transmitting mirror and the light-receiving mirror are at rest, the mirror surface of the light-receiving mirror and the mirror surface of the light-transmitting mirror may be parallel.

According to this configuration, at the small-opening end, the shift amount between the optical axis of the returning light, heading from the light-receiving mirror to the light-receiving element, and the optical axis of the light-receiving element shrinks a certain extent. As a result, uniformity of ranging precision of the direction of the object is improved a certain extent.

Furthermore, according to one or more embodiments of the present invention, the light source and the light-receiving element may be disposed around the pivot shaft tilted by an angle equal to the difference between the pivot amplitude of the light-receiving mirror and the pivot amplitude of the light-transmitting mirror.

According to this configuration, at the small-opening end, reduction of the light-receiving strength due to the shift between the optical axis of the light and the optical axis of the light-receiving element is eliminated; therefore, uniformity of ranging precision of the direction of the object improves.

Furthermore, the measuring apparatus according to one or more embodiments of the present invention further comprises: a condenser lens between the light-receiving mirror and the light-receiving element. When the light-receiving mirror is at a pivot end in the rotational direction in which the opening width increases, a luminous flux of a portion of the light incident in the parallel manner to the measuring light emitted from the light-transmitting mirror and reflected by the light-receiving mirror deviates from the condenser lens.

According to this configuration, the light-receiving strength when the light-receiving mirror is at the large-opening end of the pivot range can be reduced more effectively; therefore, uniformity of ranging precision of the direction of the object improves.

Furthermore, according to one or more embodiments of the present invention, the light-receiving mirror and the light-transmitting mirror may be connected by two connecting shafts separated in a direction perpendicular to the pivot shaft.

Effects similar to the above can be obtained even if a light-receiving mirror of such a configuration is used.

According to one or more embodiments of the present invention, a position detecting apparatus may comprise a light-transmitting mirror that pivots around a pivot shaft and reflects measuring light from a light source; a light-receiving mirror that pivots around the pivot shaft and reflects returning light from an object; and a light-receiving element that receives the returning light from the light-receiving mirror. A first mirror angle between a mirror surface of the light-receiving mirror and a direction from the pivot shaft to the light-receiving element may be larger than a second mirror angle between a mirror surface of the light-transmitting mirror and the direction.

According to one or more embodiments of the present invention, a position detecting apparatus may comprise a light-transmitting mirror that pivots around a pivot shaft and reflects measuring light from a light source; a light-receiving mirror that pivots around the pivot shaft and reflects returning light from an object; and a light-receiving element that receives the returning light from the light-receiving mirror. A mirror surface of the light-receiving mirror and a mirror surface of the light-transmitting mirror may be parallel. A first mirror angle between a mirror surface of the light-receiving mirror and a direction from the pivot shaft to the light-receiving element may be larger than a mirror angle between the mirror surface of the light-receiving mirror and a direction from the pivot shaft to the light source.

According to one or more embodiments of the present invention, a measuring method for measuring a distance from a position detecting apparatus to an object, may comprise: reflecting, with a light-transmitting mirror, measuring light from a light source; receiving, with a light-receiving mirror, returning light from an object incident and parallel to the measuring light reflected from the light-transmitting mirror; reflecting to a first direction, with the light-receiving mirror, the returning light incident in a parallel manner to the measuring light reflected from the light-transmitting mirror; and receiving, with a light-receiving element, the returning light. The first direction may be tilted in a rotational direction in which a mirror angle between the first direction and a second direction from the pivot shaft to a light-receiving element increases.

The position detecting apparatus and the measuring method according to one or more embodiments of the present invention can increase uniformity of ranging precision according to a direction of an object.

DETAILED DESCRIPTION OF EMBODIMENTS

First Example

Embodiments of the present invention will be described below, with reference to the drawings.

In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Furthermore, each diagram below is a schematic diagram and is not necessarily illustrated strictly. In each diagram, substantially identical configurations are labeled with the same reference labels, and redundant description is omitted or simplified.

(Basic Structure of Measuring Apparatus)

A measuring apparatus according to one or more embodiments of the present invention is a device that measures a distance to an object using light. For example, the measuring apparatus measures a distance between itself and the object by emitting a measuring light that scans a target range outside this measuring apparatus and receiving a returning light of this measuring light from the object, which is within the target range.

First, a basic structure of the measuring apparatus according to one or more embodiments of the present invention will be described.

Figure 1:
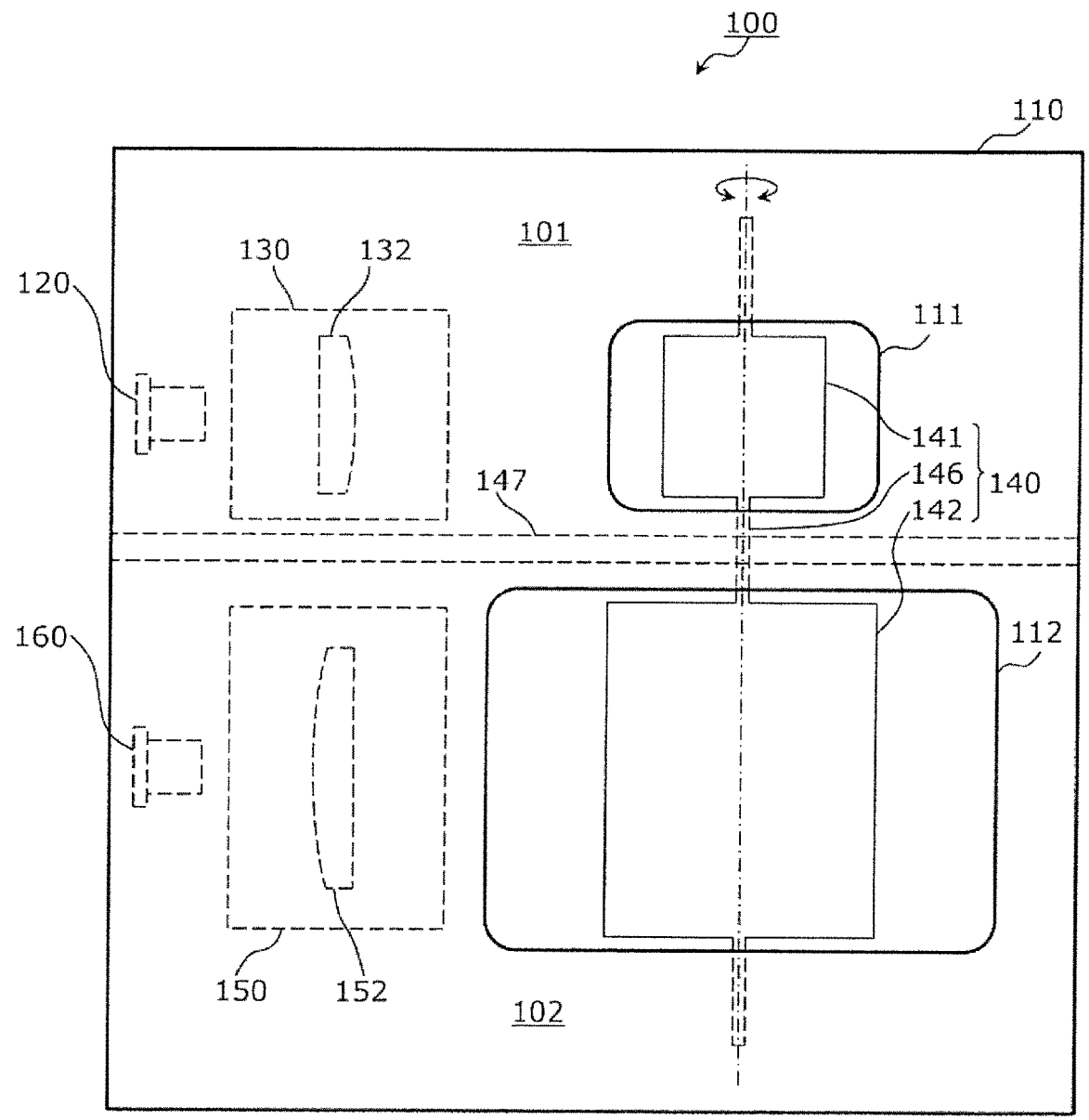
FIG. 1 is a front view illustrating one example of a configuration of a measuring apparatus according to one or more embodiments of a first example of the present invention.

FIG. 1 is a front view illustrating one example of a configuration of a measuring apparatus (position detecting apparatus) 100.

As illustrated in FIG. 1, the measuring apparatus 100 includes a housing 110, a light source 120, an optical light transmitter 130, a mirror 140, a shading plate 147, an optical light receiver 150, and a light-receiving element 160. The optical light transmitter 130 has a collimator lens 132. The mirror 140 has a light-transmitting mirror 141 and a light-receiving mirror 142, which are supported by a pivot shaft 146. The optical light receiver 150 has a condenser lens 152.

An internal space of the housing 110 is divided by the shading plate 147 into a light-sending region 101 and a light-receiving region 102.

Figure 2:
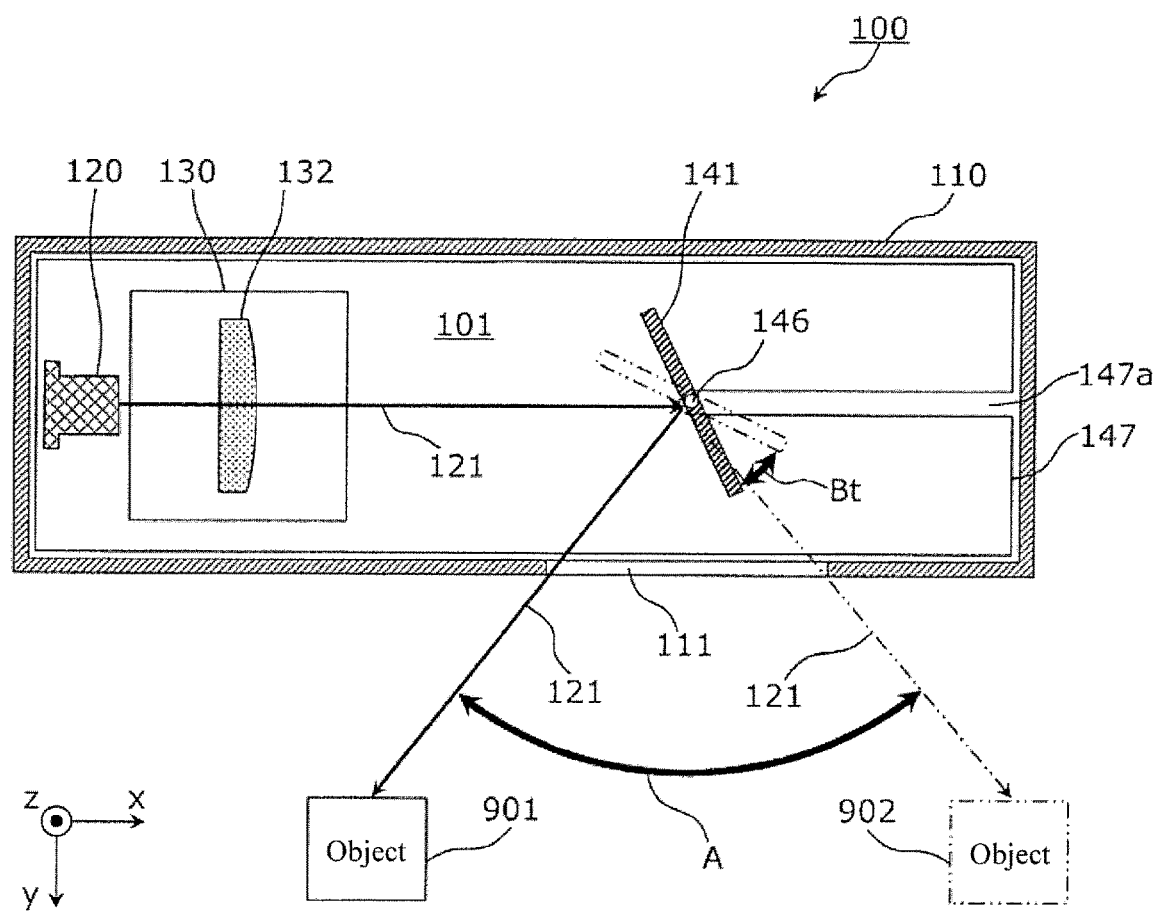
FIG. 2 is a top view illustrating one example of the configuration of the measuring apparatus according to one or more embodiments of the first example of the present invention.

FIG. 2 is a top view illustrating one example of a configuration of the light-sending region 101 of the measuring apparatus 100. As illustrated in FIG. 2, the light source 120, the optical light transmitter 130, and the light-transmitting mirror 141 are disposed in the light-sending region 101.

The light source 120 is a light source that emits the measuring light. The light source 120 may be configured by, for example, a laser diode.

The optical light transmitter 130 collimates a measuring light 121 emitted from the light source 120 by the collimator lens 132 and irradiates this to the light-transmitting mirror 141. The optical light transmitter 130 may further regulate an emission direction of the measuring light 121 using a slit plate that is not illustrated.

The light-transmitting mirror 141 pivots in a pivot range Bt being supported by the pivot shaft 146 and reflects the measuring light 121 from the light source 120 toward a direction in a target range A. The measuring light 121 reflected by the light-transmitting mirror 141 is emitted outside the measuring apparatus 100 from a light-sending window 111 provided in the housing 110.

The shading plate 147 suppresses stray light arising in the light-sending region 101 from entering the light-receiving region 102. "Stray light" refers to measuring light 121 that undergoes diffuse reflection at a surface of the light-transmitting mirror 141, an inner surface of the light-sending window 111, and the like and causes reduction of ranging precision when it enters the light-receiving region 102.

The measuring light 121 emitted outside the measuring apparatus 100 from the light-sending window 111 arrives at objects 901, 902 in the target range A and undergoes diffuse reflection at the objects 901, 902.

Figure 3:
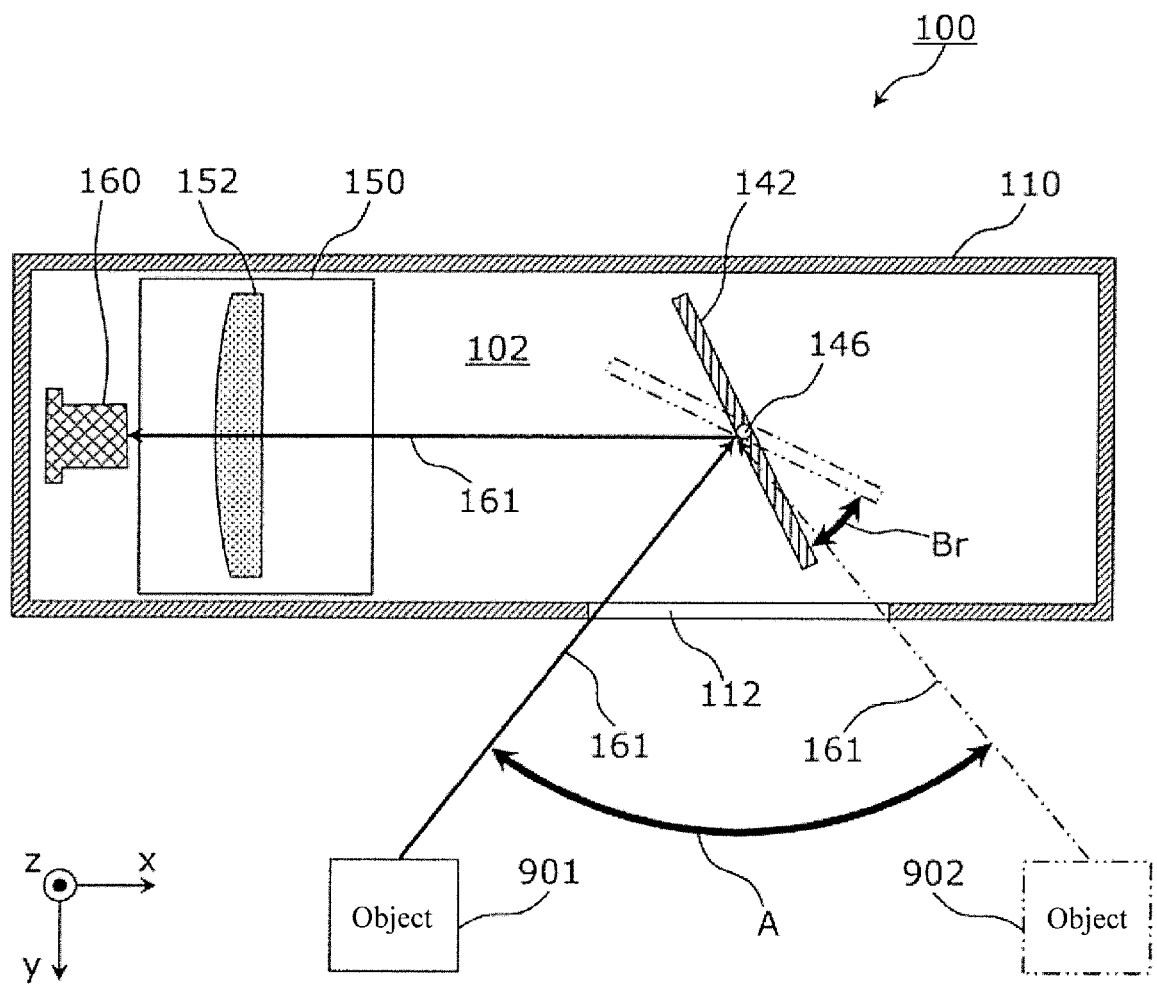
FIG. 3 is a top view illustrating one example of the configuration of the measuring apparatus according to one or more embodiments of the first example of the present invention.

FIG. 3 is a top view illustrating one example of a configuration of the light-receiving region 102 of the measuring apparatus 100. As illustrated in FIG. 3, the light-receiving mirror 142, the optical light receiver 150, and the light-receiving element 160 are disposed in the light-receiving region 102.

Of the measuring light 121 that undergoes diffuse reflection at the objects 901, 902, a returning light 161 that returns to an arrival direction of the measuring light 121 becomes incident to an inside of the measuring apparatus 100 from a light-receiving window 112 provided in the housing 110.

The light-receiving mirror 142 pivots being supported by the pivot shaft 146 and reflects the returning light 161 toward the light-receiving element 160.

The optical light receiver 150 condenses the returning light 161 reflected at the light-receiving mirror 142 to the light-receiving element 160 by the condenser lens 152. The optical light receiver 150 may further remove noise light of wavelengths other than the measuring light using a bandpass filter that is not illustrated.

The light-receiving element 160 is an element that generates an electrical signal according to a strength of the returning light 161, which becomes incident thereto. The light-receiving element 160 may be configured by, for example, an avalanche photodiode.

(Overall Configuration of Mirror)

Next, one example of an overall configuration of the mirror 140 is described.

Figure 4:
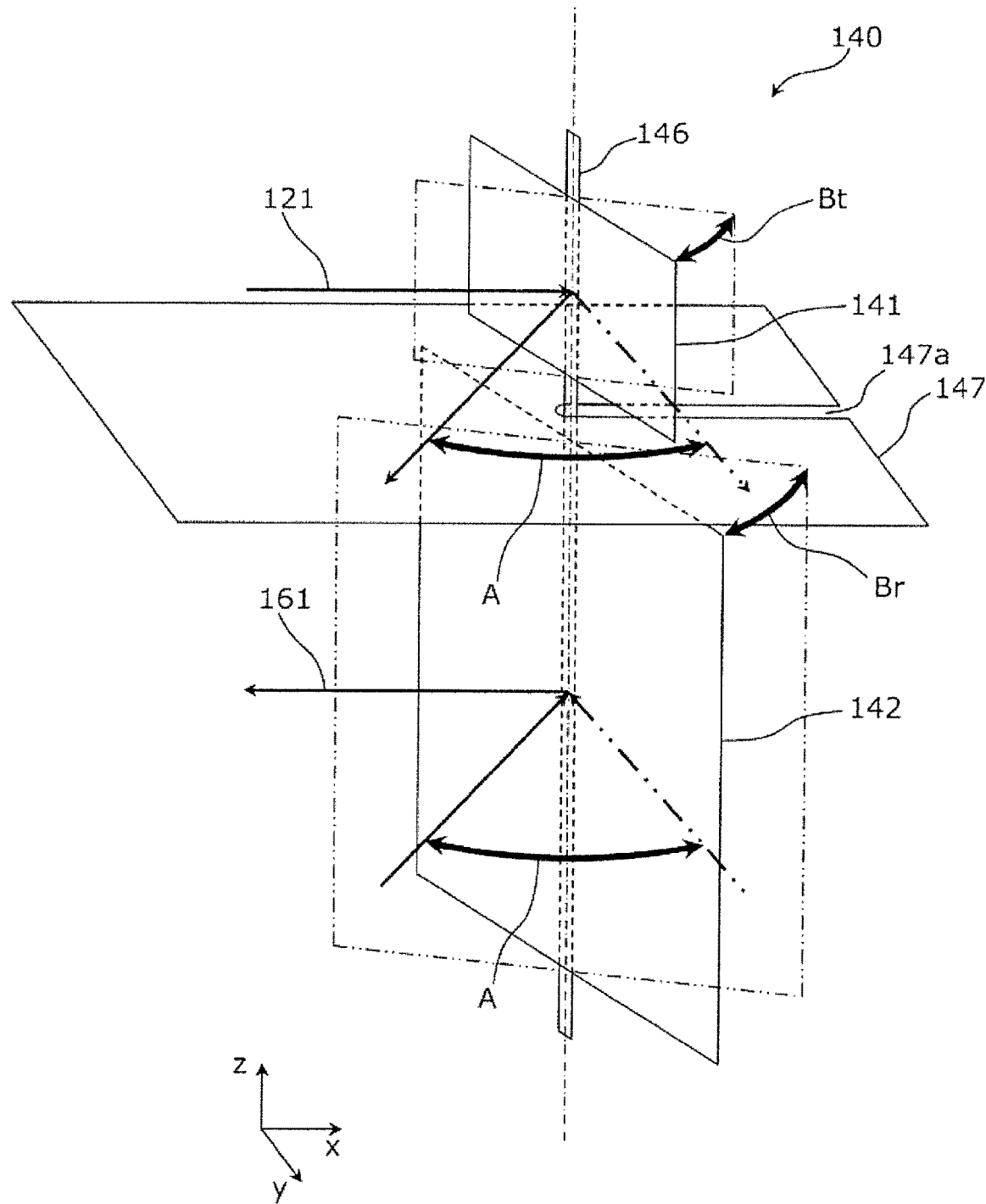
FIG. 4 is a perspective view illustrating one example of an overall configuration of a mirror according to one or more embodiments of the first example of the present invention.

FIG. 4 is a perspective view illustrating one example of the overall configuration of the mirror 140. FIG. 4 illustrates an entirety of the mirror 140, which includes the light-transmitting mirror 141 in FIG. 2 and the light-receiving mirror 142 in FIG. 3. As one example, the mirror 140 is configured affixing respective reverse surfaces (opposite surfaces of reflective surfaces) of the light-transmitting mirror 141 and the light-receiving mirror 142 on the pivot shaft 146, which is elongated.

The light-transmitting mirror 141 and the light-receiving mirror 142 are, for example, metal-film mirrors. The pivot shaft 146 is formed by, for example, punching out sheet metal. Moreover, while illustration is omitted, a fixed portion connected to upper and lower ends of the pivot shaft 146 may be punched out from the same sheet metal and the pivot shaft 146 may be fixed to the housing 110 via this fixed portion.

By imparting a torque that varies periodically around the pivot shaft 146 to the mirror 140, the mirror 140 is made to pivot around the pivot shaft 146. As a result, the pivot shaft 146 functions as a torsion bar spring and the mirror 140 operates as a resonant scanner mirror of a natural frequency decided by a moment of inertia around the pivot shaft 146 and a torsion spring constant of the pivot shaft 146.

An actuator that imparts the torque to the mirror 140 is not particularly limited. As one example, an actuator utilizing electromagnetic force, electrostatic force, or piezoelectric displacement can be used.

(Functional Configuration of Measuring Apparatus)

Next, a functional configuration of the measuring apparatus 100 is described.

Figure 5:
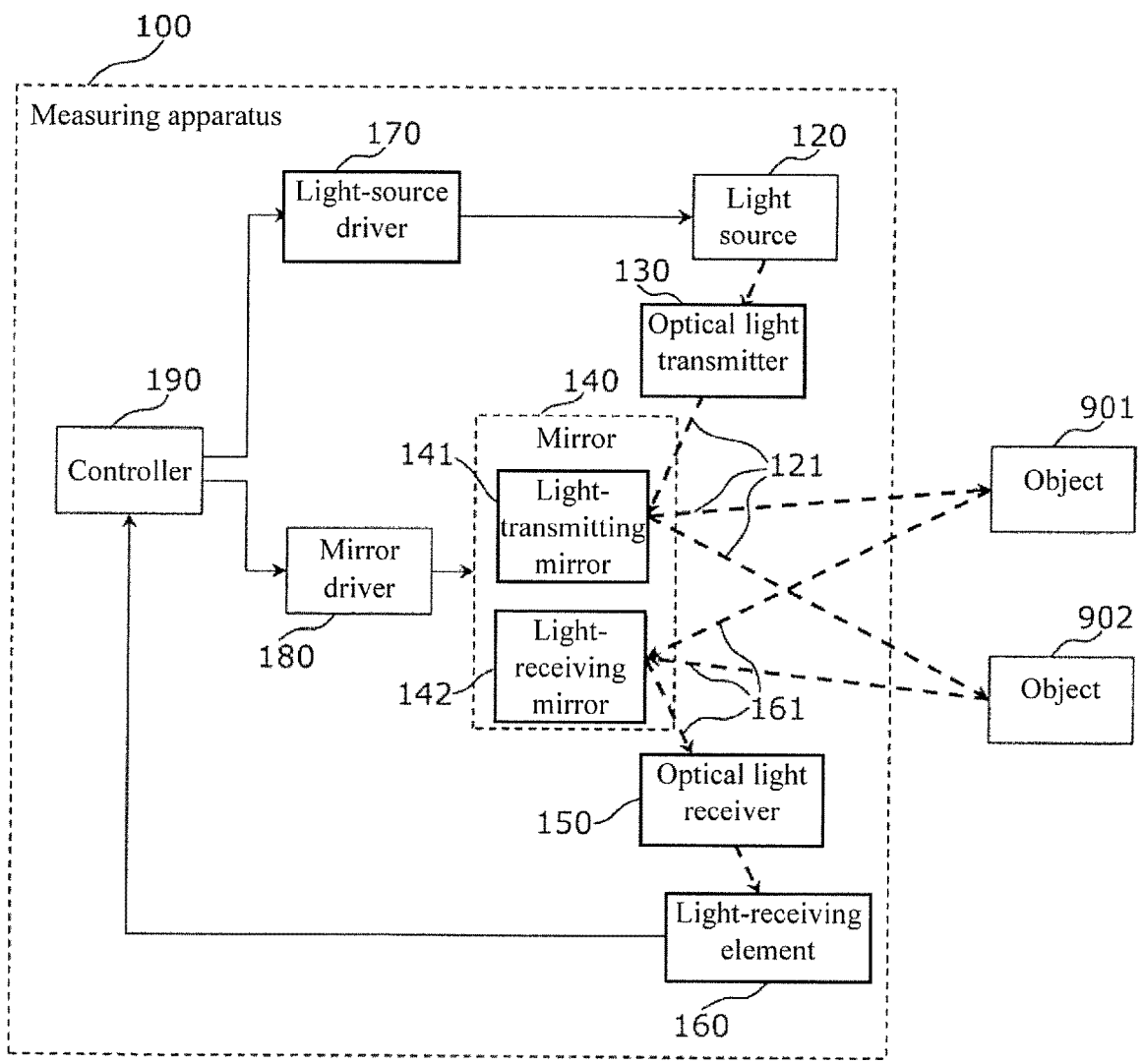
FIG. 5 is a block diagram illustrating one example of a functional configuration of the measuring apparatus according to one or more embodiments of the first example of the present invention.

FIG. 5 is a block diagram illustrating one example of the functional configuration of the measuring apparatus 100. As illustrated in FIG. 5, the measuring apparatus 100 functionally includes the light source 120; the optical light transmitter 130; the mirror 140, which includes the light-transmitting mirror 141 and the light-receiving mirror 142; the optical light receiver 150; the light-receiving element 160; a light-source driver 170; a mirror driver 180; and a controller 190.

The light-source driver 170 drives the light sources 120. For example, the light-source driver 170 causes the light source 120 to emit a laser light according to a modulation signal output from the controller 190.

The mirror driver 180 drives the mirror 140 (that is, the light-transmitting mirror 141 and the light-receiving mirror 142). For example, the mirror driver 180 generates a drive current for driving the mirror 140 based on a drive signal from the controller 190. The mirror driver 180 outputs the generated drive current to an actuator that is not illustrated. As a result, the light-transmitting mirror 141 and the light-receiving mirror 142 pivot integrally around the pivot shaft 146 by the actuator.

The controller 190 is a controller that controls the measuring apparatus 100. The controller 190 is configured by, for example, system LSI (large-scale integration), an IC (integrated circuit), a microcontroller, or the like.

Specifically, the controller 190 controls the light-source driver 170 and the mirror driver 180. For example, the controller 190 outputs the modulation signal to the light-source driver 170 and outputs the drive signal to the mirror driver 180. For example, the controller 190 outputs the drive signal.

Furthermore, the controller 190 calculates a distance from the measuring apparatus 100 to the objects 901, 902 based on a phase difference between the light emitted from the light source 120 and the light received by the light-receiving element 160. Specifically, the controller 190 calculates this phase difference based on, for example, the modulation signal output to the light-source driver 170 and a light-receiving signal input from the light-receiving element 160. Using the calculated phase difference, the controller 190 calculates a time for the light emitted from the light source 120 to arrive at the light-receiving element 160. Moreover, the controller 190 calculates the distance from the measuring apparatus 100 to the objects 901, 902 by multiplying ½ of the calculated time by the speed of light.

Furthermore, the controller 190 specifies a direction of the objects 901, 902 relative to the measuring apparatus 100 from a tilt of the light-transmitting mirror 141. The tilt of the light-transmitting mirror 141 during pivoting is defined as a rotational angle of the light-transmitting mirror 141 around the pivot shaft 146 with a position of the light-transmitting mirror 141 at rest (that is, not pivoting) as a reference position and clockwise as positive.

The controller 190 may detect the tilt of the light-transmitting mirror 141 based on a signal from a photodiode (not illustrated) disposed in a predetermined position. This photodiode may be disposed in a position to which the measuring light 121 reflected at the light-transmitting mirror 141 becomes incident when the light-transmitting mirror 141 rotates to a predetermined tilt outside the range Bt.

(Fundamental Light-Receiving Operation)

Figure 6A:
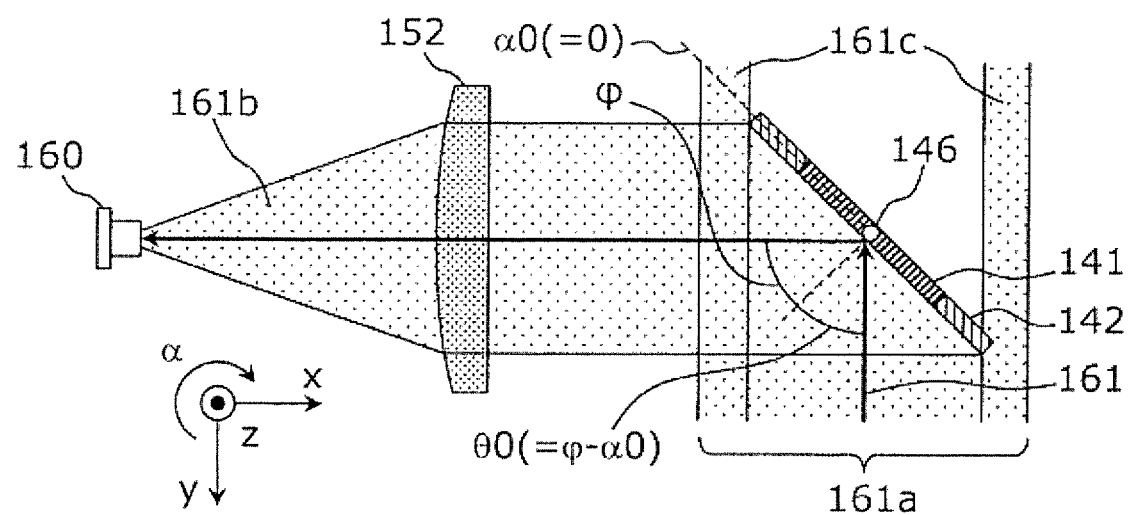
FIG. 6A is a diagram illustrating one example of a fundamental light-receiving operation of the measuring apparatus according to one or more embodiments of the first example of the present invention.
Figure 6B:
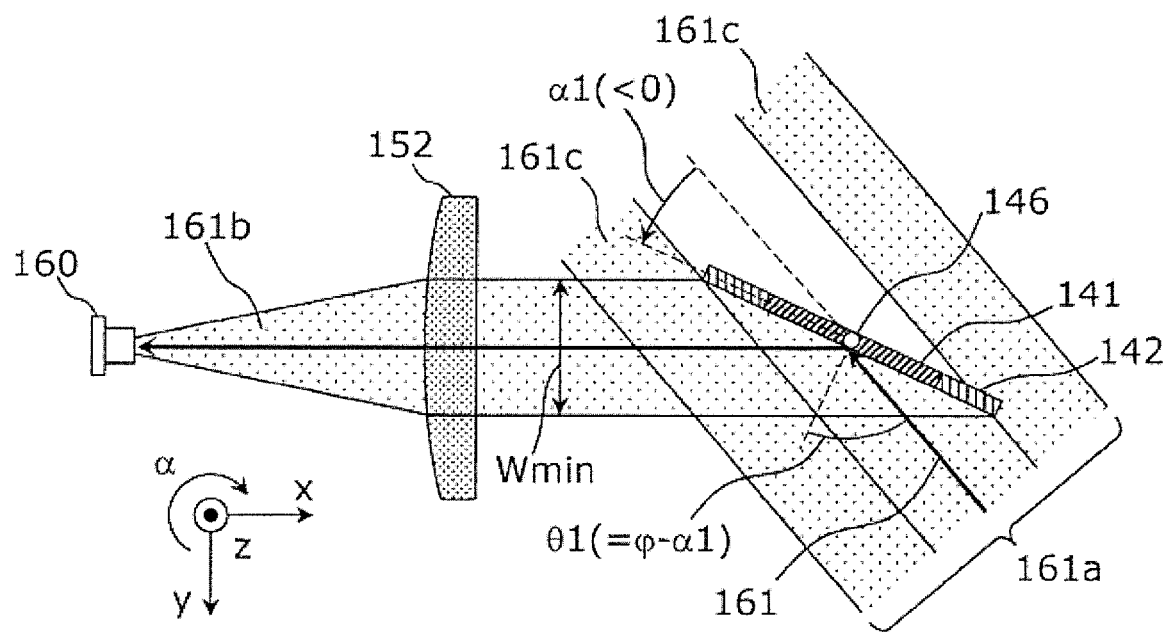
FIG. 6B is a diagram illustrating one example of the fundamental light-receiving operation of the measuring apparatus according to one or more embodiments of the first example of the present invention.
Figure 6C:
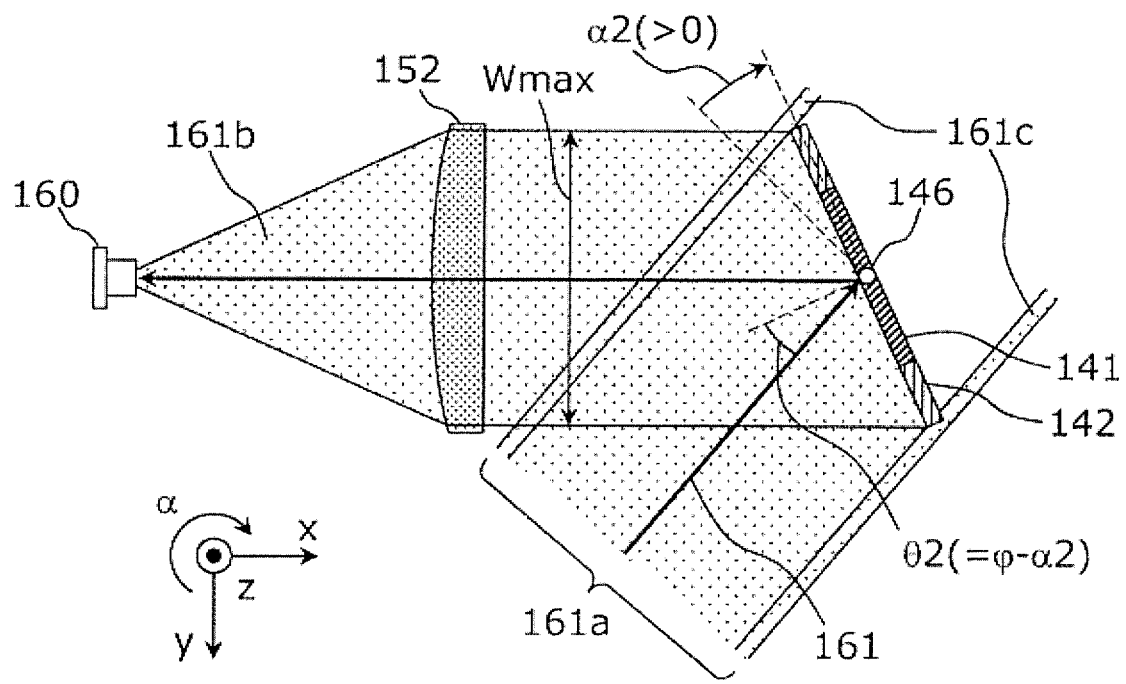
FIG. 6C is a diagram illustrating one example of the fundamental light-receiving operation of the measuring apparatus according to one or more embodiments of the first example of the present invention.

Next, a fundamental light-receiving operation in the measuring apparatus 100 is described using FIG. 6A, FIG. 6B, and FIG. 6C.

FIG. 6A, FIG. 6B, and FIG. 6C are respectively diagrams schematically illustrating one example of a path of the returning light 161 that arrives at the light-receiving element 160 when the light-receiving mirror 142 is at a center, a first end, and a second end of a pivot range viewed from a direction of the pivot shaft 146 (z-axis direction).

In the description below, the following premises are provided for concision.

A tilt α of the light-receiving mirror 142 during pivoting is defined as a rotational angle around the pivot shaft 146 with a position of the light-receiving mirror 142 at rest (that is, stopped pivoting) as a reference position α0 and clockwise as positive. This reference position and the center of the pivot range of the light-receiving mirror 142 are generally the same. As a non-limiting specific example for illustration, the tilts of the light-receiving mirror 142 at the center, the first end, and the second end of the pivot range are respectively made to be θ0=0 degrees, α1=−22.5 degrees (<0 degrees), and α2=+22.5 degrees (>0 degrees). An angle φ formed by an optical axis, heading from the light-receiving mirror 142 in the resting position to the light-receiving element 160, and a normal line of the light-receiving mirror 142 is defined as an installation angle of the light-receiving mirror 142; as a similar specific example, this is made to be 45 degrees.

Under such premises, an incidence angle θ of the returning light 161 that can arrive at the light-receiving element 160 is an angle where the tilt α of the light-receiving mirror 142 is subtracted from the installation angle φ of the light-receiving mirror 142. That is, the incidence angle θ is smaller the greater the tilt α.

Now, as illustrated in FIG. 6A, FIG. 6B, and FIG. 6C, it is supposed that the returning light 161 is a luminous flux 161a spread wider than the light-receiving mirror 142. At this time, of the luminous flux 161a, a luminous flux 161b of a portion reflected at the light-receiving mirror 142 arrives at the light-receiving element 160, but a luminous flux 161c of a remaining portion cannot arrive at the light-receiving element 160 and is lost.

A size of the luminous flux 161b that arrives at the light-receiving element 160—that is, a light-receiving strength of the returning light 161 at the light-receiving element 160—is proportional to an appearance of the light-receiving mirror 142 viewed from the light-receiving element 160—that is, a size of a projection shape to a light-receiving-optical-axis direction connecting the light-receiving element 160 and the light-receiving mirror 142.

A projection dimension of a mirror width (denoted as "opening width" hereinbelow), which is a dimension of a direction orthogonal to the pivot shaft 146 (as one example, a y direction) of the light-receiving mirror 142, varies between a minimum value Wmin and a maximum value Wmax according to the tilt of the light-receiving mirror 142. While illustration is omitted, a projection dimension of a direction parallel to the pivot shaft 146 (z-axis direction) of the light-receiving mirror 142 (denoted as "height" hereinbelow) is a constant value H.

As a result, the light-receiving strength of the returning light 161 at the light-receiving element 160 varies between a light-receiving strength corresponding to the minimum opening width Wmin and a light-receiving strength corresponding to the maximum opening width Wmax according to the tilt of the light-receiving mirror 142. An opening ratio is represented by, for example, a value of cos θ of the incidence angle θ.

In the description below, of the two ends of the pivot range of the light-receiving mirror 142, one end where the opening width of the light-receiving mirror 142 is smaller ("first end" described above) is referred to as a small-opening end and the other end where the opening width of the light-receiving mirror 142 is larger ("second end" described above) is referred to as a large-opening end.

Figure 7:
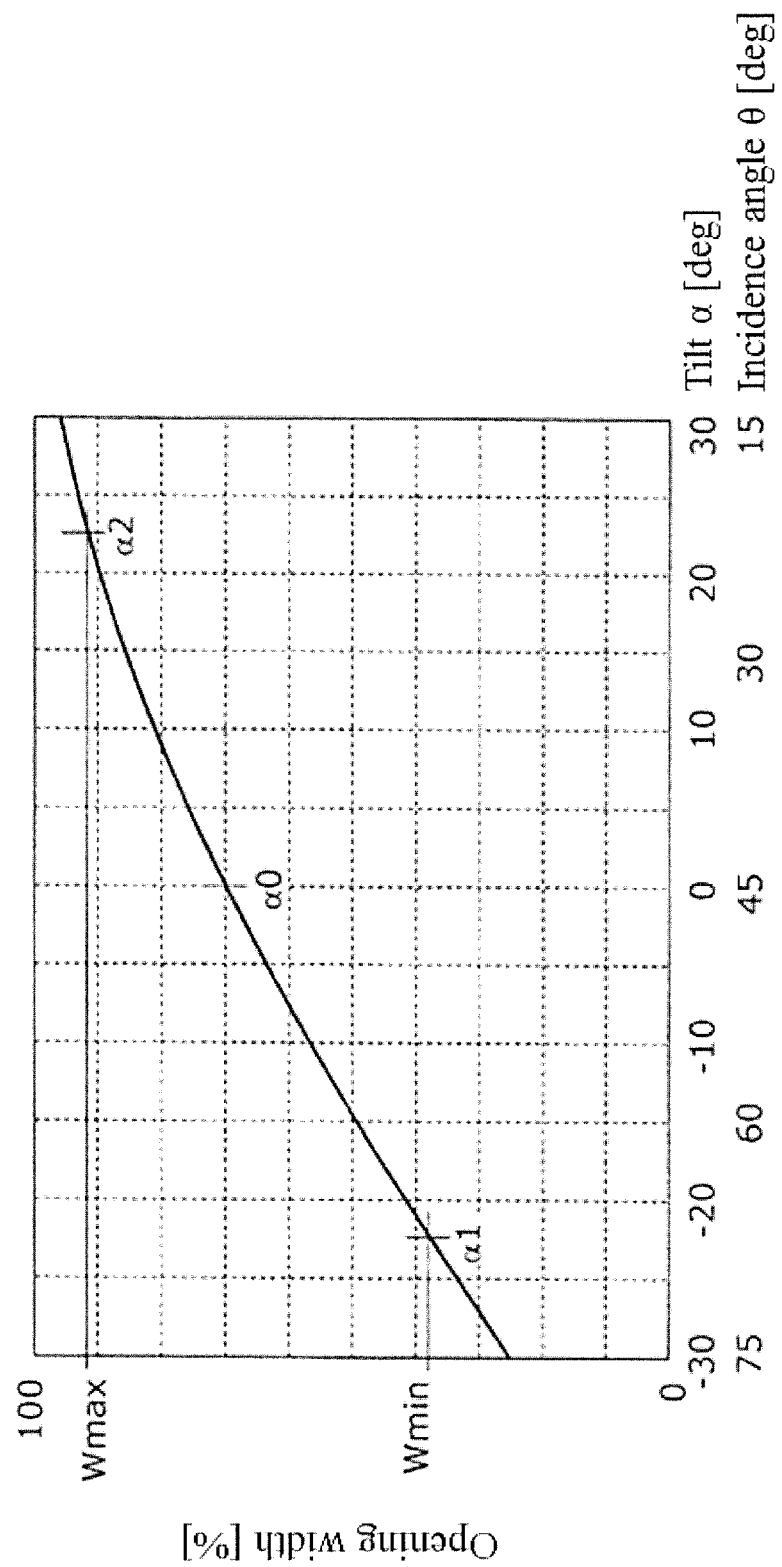
FIG. 7 is a graph illustrating one example of an opening ratio relative to a tilt of a light-receiving mirror.

FIG. 7 is a graph illustrating one example of a relationship between the tilt α of the light-receiving mirror 142 and the opening ratio θ. In FIG. 7, based on the illustrations in FIG. 6A, FIG. 6B, and FIG. 6C, the pivot range of the light-receiving mirror 142 is made to be a range of ±22.5° for the tilt α, and the opening ratio is illustrated with the incidence angle θ of the returning light 161 that arrives at the light-receiving element 160 when the tilt α is 0 as 45°. The tilt α and the incidence angle θ are shown together on the horizontal axis in FIG. 6A, FIG. 6B, and FIG. 6C.

Thus, because the opening ratio of the light-receiving mirror 142 has an incidence-angle dependency, the light-receiving strength at the light-receiving element 160 of the returning light 161 varies according to the direction of the object. This is a first cause whereby uniformity of ranging precision of the direction of the object is impaired, which impairment is indicated in the Background section.

Next, a second cause whereby uniformity of ranging precision of the direction of the object is impaired is described.

In FIG. 6A, FIG. 6B, and FIG. 6C, a shift between the tilt of the light-transmitting mirror 141 and the tilt of the light-receiving mirror 142 is not considered. However, in actuality, the tilt of the light-transmitting mirror 141 and the tilt of the light-receiving mirror 142 shift during pivoting. This shift is due to a difference in moments of inertia between the light-transmitting mirror 141 and the light-receiving mirror 142 and arises because a pivot amplitude of the light-transmitting mirror 141 is smaller than a pivot amplitude of the light-receiving mirror 142.

Figure 8A:
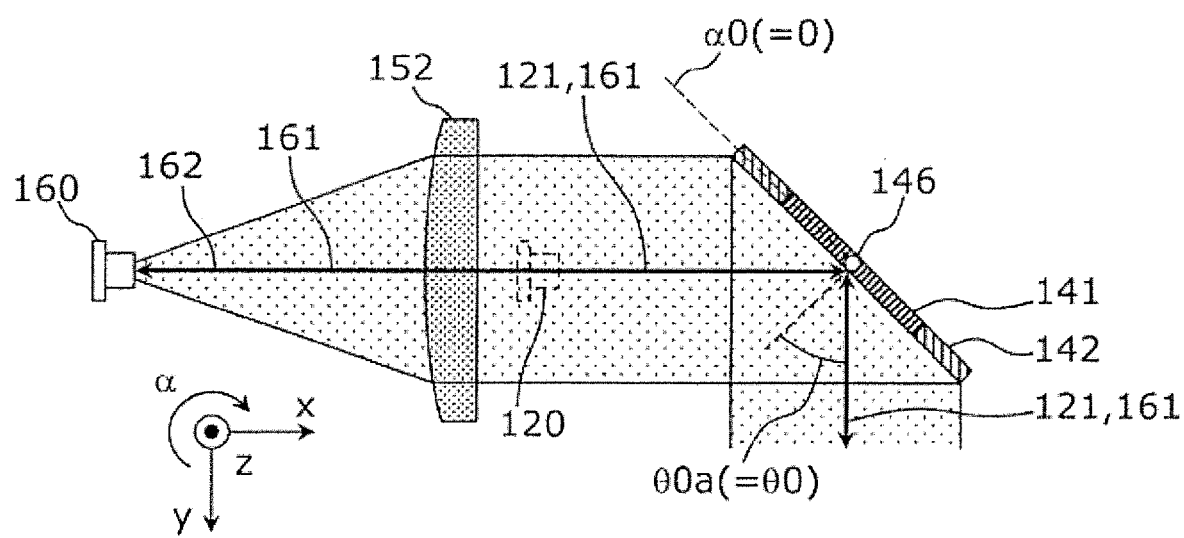
FIG. 8A is a diagram schematically illustrating one example of a disposition of an optical system according to a comparative example.
Figure 8B:
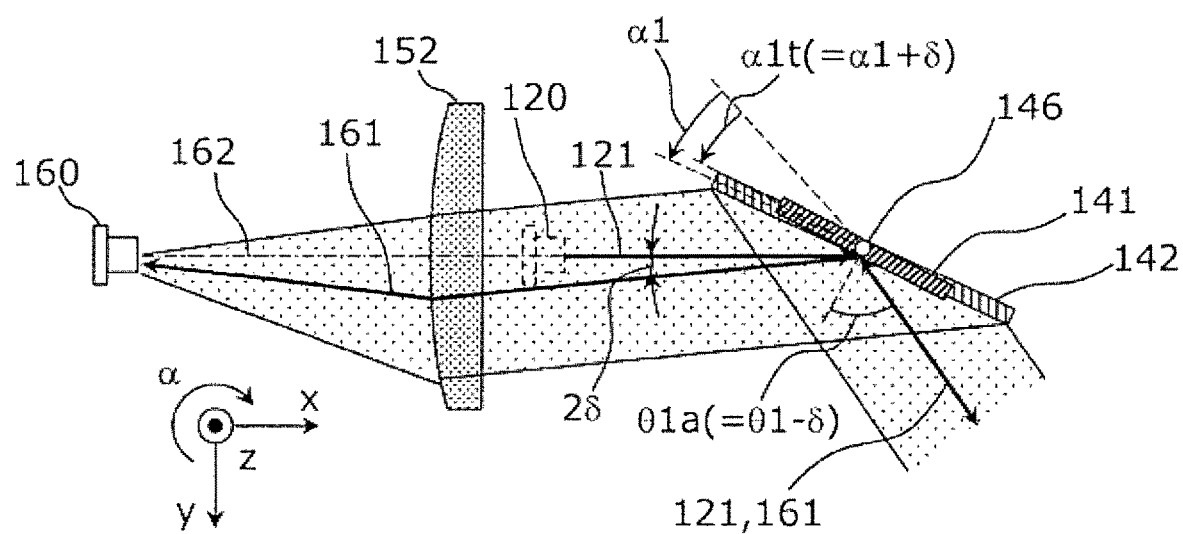
FIG. 8B is a diagram schematically illustrating one example of the disposition of the optical system according to the comparative example.
Figure 8C:
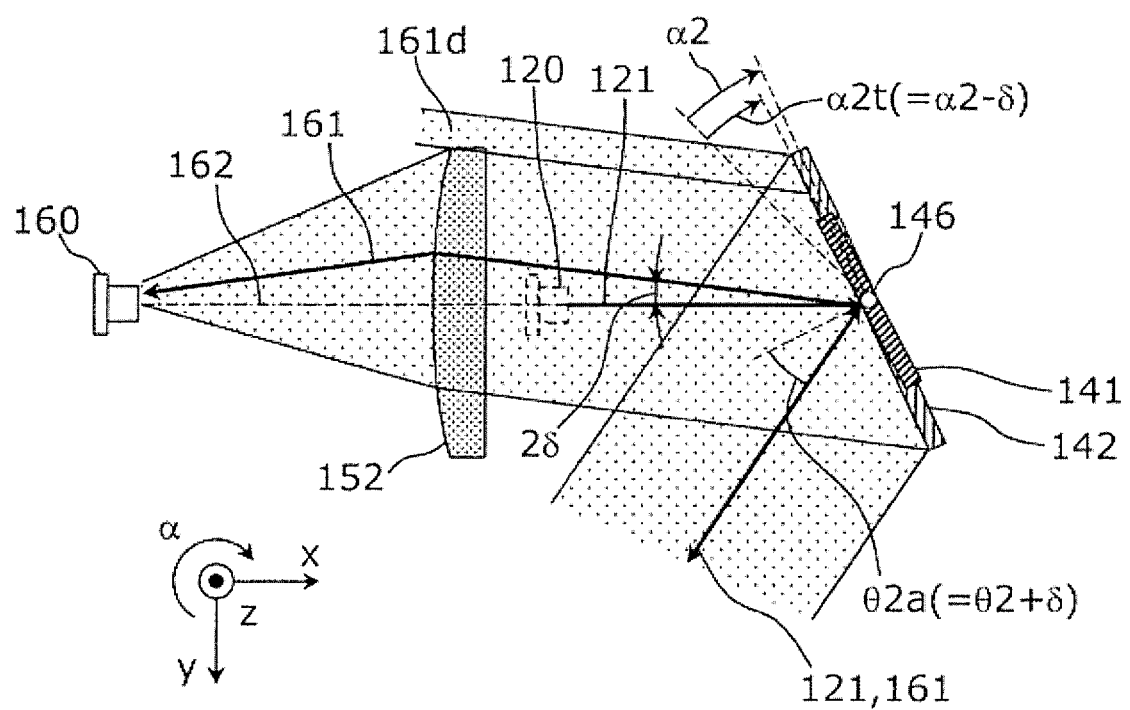
FIG. 8C is a diagram schematically illustrating one example of the disposition of the optical system according to the comparative example.

FIG. 8A, FIG. 8B, and FIG. 8C are respectively diagrams schematically illustrating one actual example of the path of the returning light 161 that arrives at the light-receiving element 160 when the light-receiving mirror 142 is at the center, the small-opening end, and the large-opening end of the pivot range viewed from the direction of the pivot shaft 146 (z-axis direction). In FIG. 8A, FIG. 8B, and FIG. 8C, as one example, the light source 120 and the light-receiving element 160 are disposed in the same direction around the pivot shaft 146 and the pivot amplitude of the light-transmitting mirror 141 is made to be 2δ less than the pivot amplitude of the light-receiving mirror 142.

The disposition in FIG. 8A is the same as a disposition where the light-transmitting mirror 141 and the light-receiving mirror 142 are at rest. In FIG. 8A, the tilt α0 of the light-transmitting mirror 141 and the tilt α0 of the light-receiving mirror 142 match. As a result, an optical axis of the returning light 161 and an optical axis 162 of the light-receiving element 160 match.

In FIG. 8B, a tilt α1t of the light-transmitting mirror 141 is shifted +δ from a tilt α1 of the light-receiving mirror 142. As a result, the optical axis of the returning light 161 is shifted 2δ from the optical axis 162 of the light-receiving element 160.

In FIG. 8C, a tilt α2t of the light-transmitting mirror 141 is shifted −δ from a tilt α2 of the light-receiving mirror 142. As a result, the optical axis of the returning light 161 is shifted 2δ from the optical axis 162 of the light-receiving element 160.

Figure 9:
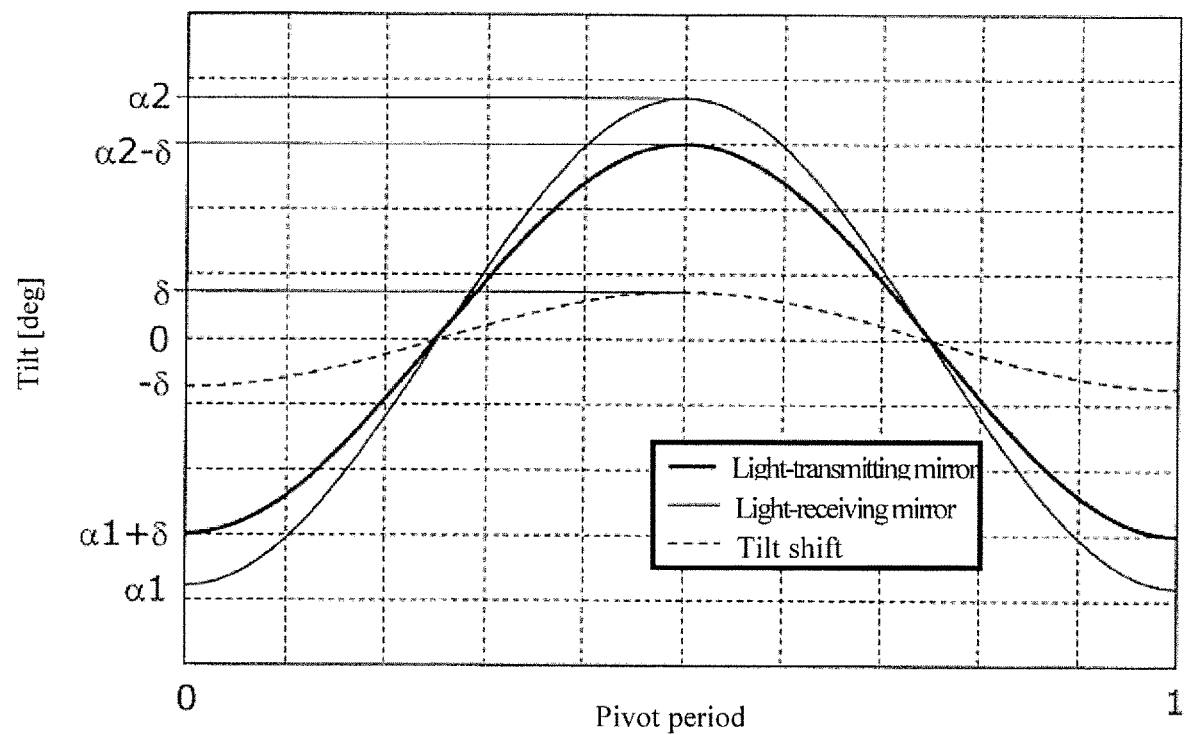
FIG. 9 is a graph illustrating one example of a tilt of a mirror in a pivot period.

FIG. 9 is a graph illustrating one example of a change in one period of pivoting of the tilt of the light-transmitting mirror 141, the tilt of the light-receiving mirror 142, and the tilt shift between the light-transmitting mirror 141 and the light-receiving mirror 142. As illustrated in FIG. 9, the tilt of the light-transmitting mirror 141 and the tilt of the light-receiving mirror 142 match at the center of pivoting, but a difference enlarges in moving away from the center of pivoting and shifts ±δ at the two ends of pivoting.

A shift between the optical axis of the returning light 161, heading from the light-receiving mirror 142 toward the light-receiving element 160, and the optical axis 162 of the light-receiving element 160 arises by the shift between the tilt of the light-transmitting mirror 141 and the tilt of the light-receiving mirror 142. As a result, light-receiving loss arises and the light-receiving strength of the returning light 161 in the light-receiving element 161 is reduced. This light-receiving loss can include, for example, a condensing error of the condenser lens 152 (FIG. 8B, FIG. 8C) and a deviation from the condenser lens 152 of a portion of the returning light 161 (FIG. 8C).

Such light-receiving loss is the second cause whereby uniformity of ranging precision of the direction of the object is impaired.

By the incidence-angle dependency of the opening width that is the first cause described above and the second cause being combined, the light-receiving strength is further reduced when the light-receiving mirror 142 is at the small-opening end of the pivot range (FIG. 8B) and uniformity of ranging precision of the direction of the object comes to be more greatly impaired.

(Improvement of Disposition of Optical System)

Therefore, the present inventors propose an improved disposition of the light source 120, the light-transmitting mirror 141, the light-receiving mirror 142, and the light-receiving element 160. The proposed disposition is one where when the light-transmitting mirror 141 and the light-receiving mirror 142 are at rest the light-receiving mirror 142 reflects the returning light 161 in a direction tilted from a direction of the light-receiving element 160 to a direction in which the opening width increases. The light-transmitting mirror 141 and the light-receiving mirror 142 being at rest is defined as the light-transmitting mirror 141 and the light receiving mirror 142 not pivoting and staying steadily at rest and does not include being instantaneously at rest when an angular velocity becomes 0 at the two ends of pivoting.

One example of the measuring apparatus 100 having the disposition according to one or more embodiments of the first example of the present invention is described below.

Figure 10A:
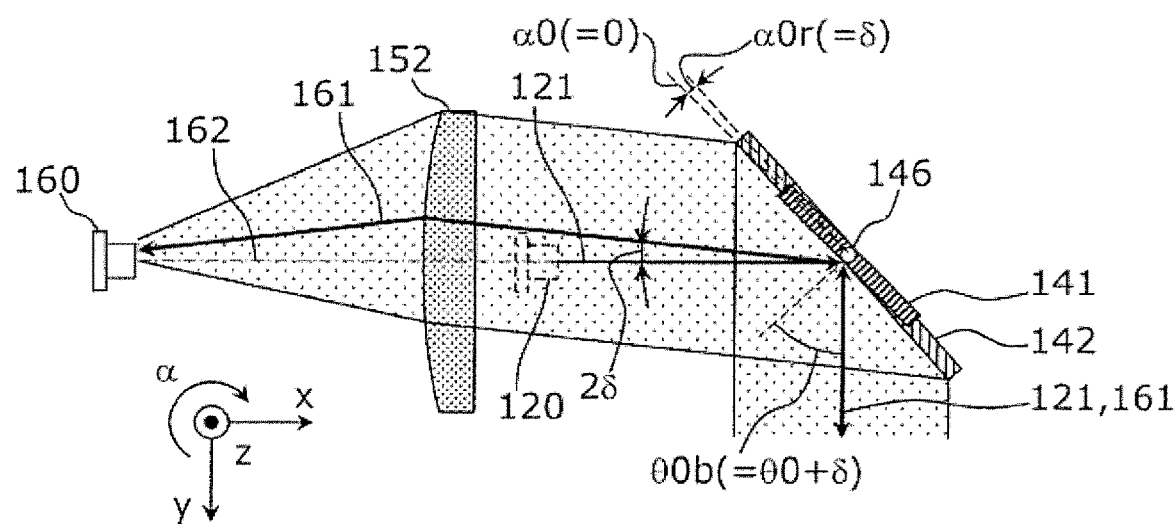
FIG. 10A is a diagram schematically illustrating one example of a disposition of an optical system according to one or more embodiments of the first example of the present invention.
Figure 10B:
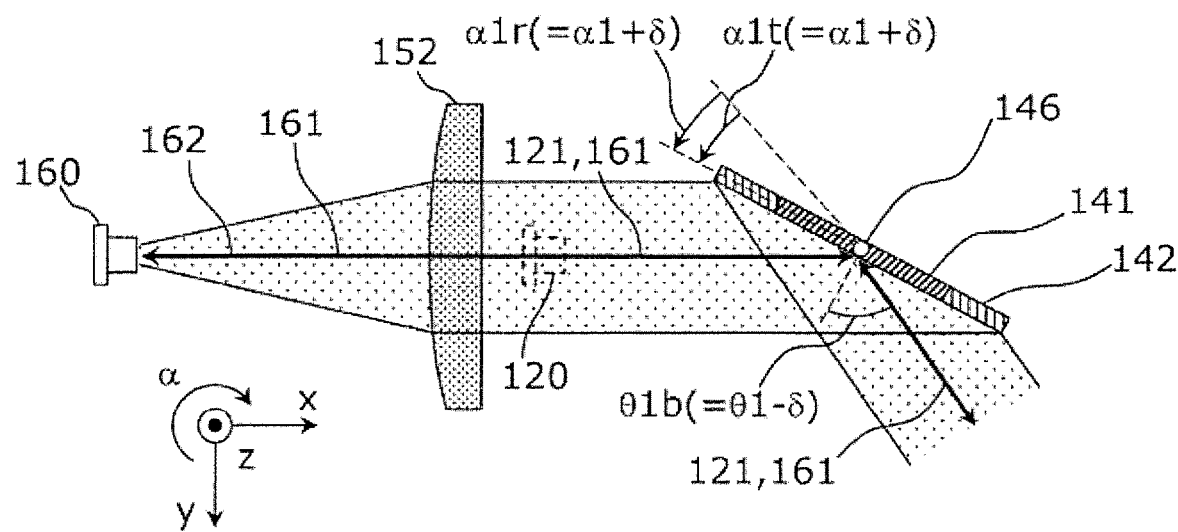
FIG. 10B is a diagram schematically illustrating one example of the disposition of the optical system according to one or more embodiments of the first example of the present invention.
Figure 10C:
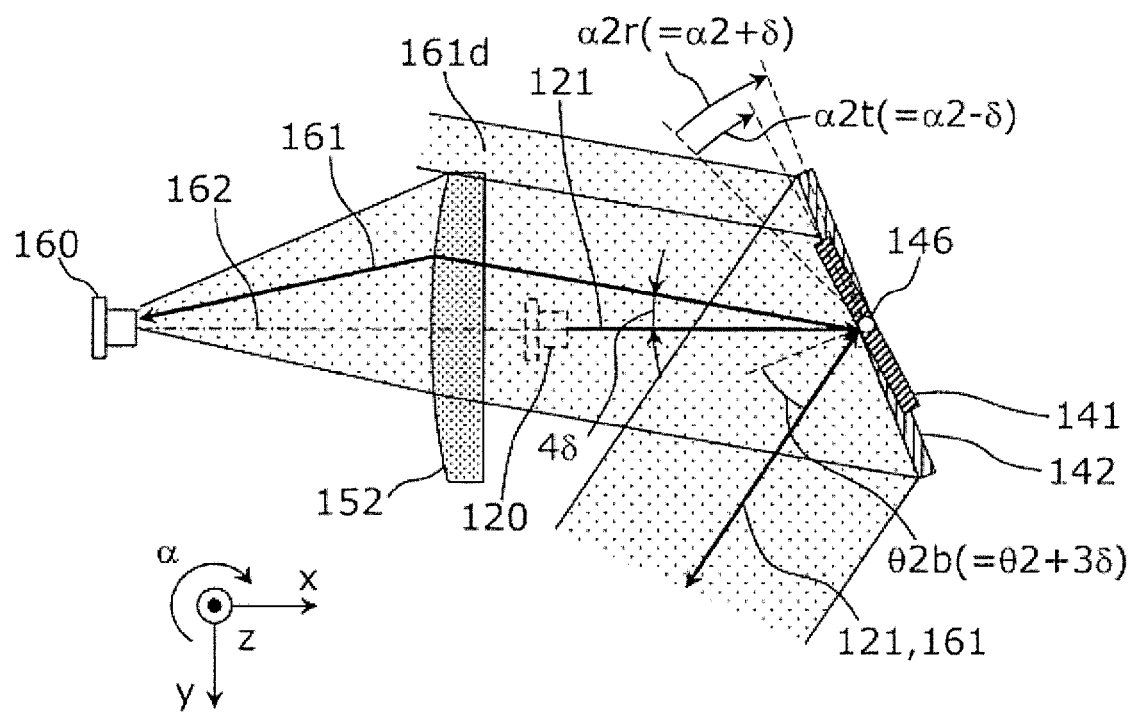
FIG. 10C is a diagram schematically illustrating one example of the disposition of the optical system according to one or more embodiments of the first example of the present invention.

FIG. 10A, FIG. 10B, and FIG. 10C are respectively diagrams schematically illustrating one actual example of the path of the returning light 161 that arrives at the light-receiving element 160 when the light-receiving mirror 142 is at the center, the small-opening end, and the large-opening end of the pivot range viewed from the direction of the pivot shaft 146 (z-axis direction).

In FIG. 10A, FIG. 10B, and FIG. 10C, similarly to FIG. 8A, FIG. 8B, and FIG. 8C, the light source 120 and the light-receiving element 160 are in the same direction around the pivot shaft 146 and the pivot amplitude of the light-transmitting mirror 141 is made to be 2δ less than the pivot amplitude of the light-receiving mirror 142.

The disposition in FIG. 10A is the same as the disposition where the light-transmitting mirror 141 and the light-receiving mirror 142 are at rest. As illustrated in FIG. 10A, a tilt α0r of the light-receiving mirror 142 is shifted from the tilt θ0 of the light-transmitting mirror 141 to the direction in which the opening width of the light-receiving mirror 142 increases (right-rotating direction) viewed in the direction of the pivot shaft 146 (z-axis direction).

That is, in the disposition of the optical system illustrated in FIG. 10A, a mirror surface of the light-receiving mirror 142 at the pivot center (or at rest) is intentionally tilted by the angle δ from a mirror surface of the light-transmitting mirror 141 at the pivot center (or at rest) to the direction in which the opening width of the light-receiving mirror 142 increases. In other words, a mirror angle (first mirror angle) between a mirror surface of the light-receiving mirror 142 and a direction from the pivot shaft 146 to the light-receiving element 160 is larger than a mirror angle (second mirror angle) between a mirror surface of the light-transmitting mirror and the direction.

According to this disposition, the optical axis of the returning light 161 heading from the light-receiving mirror 142 to the light-receiving element 160, compared to a situation where no intentional shift is provided in the tilt of the light-receiving mirror 142 and the tilt of the light-transmitting mirror 141, tilts by the angle 2δ to the direction in which the opening width of the light-receiving mirror 142 increases.

As a result, the shift amount between the optical axis of the returning light 161, heading from the light-receiving mirror 142 to the light-receiving element 160, and the optical axis 162 of the light-receiving element 160 shrinks at the small-opening end of the pivot range of the light-receiving mirror 142 and enlarges at the large-opening end. As a result, reduction of the light-receiving strength when the light-receiving mirror 142 is at the small-opening end of the pivot range is mitigated; therefore, uniformity of ranging precision of the direction of the object improves.

The angle δ by which the light-receiving mirror 142 and the light-transmitting mirror 141 are shifted may be equal to a half amount of a difference between the pivot amplitude of the light-receiving mirror 142 and the pivot amplitude of the light-transmitting mirror 141.

According to this disposition, as illustrated in FIG. 10B, the light-receiving mirror 142 reflects the returning light 161 to the direction of the light-receiving element 160 when at the small-opening end of the pivot range.

As a result, at the small-opening end, reduction of the light-receiving strength due to the shift between the optical axis of the returning light 161 and the optical axis 162 of the light-receiving element 160 is eliminated; therefore, uniformity of ranging precision of the direction of the object improves.

Furthermore, as illustrated in FIG. 10C, when the light-receiving mirror 142 is at the large-opening end of the pivot range, of the returning light 161 heading from the light-receiving mirror 142 to the light-receiving element 160, a luminous flux 161d that deviates from the condenser lens 152 increases more than the situation where no intentional shift is provided.

As a result, the light-receiving strength when the light-receiving mirror 142 is at the large-opening end of the pivot range can be reduced more effectively; therefore, uniformity of ranging precision of the direction of the object improves.

Figure 11:
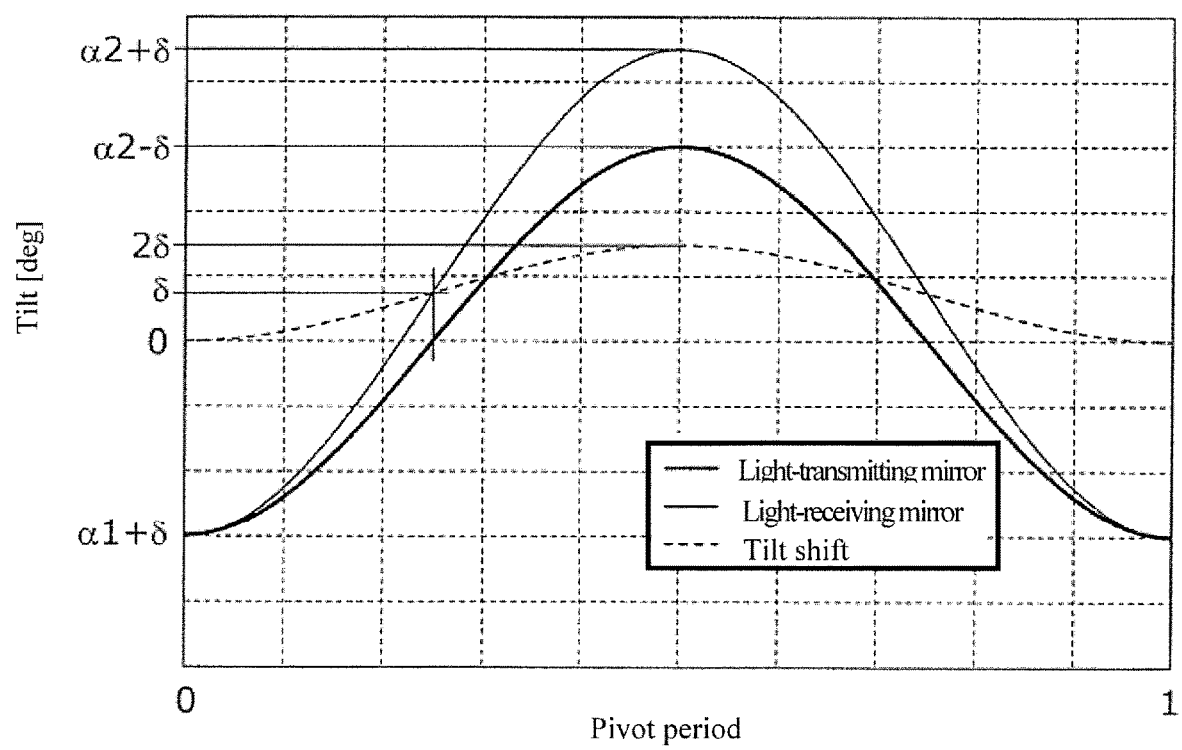
FIG. 11 is a graph illustrating one example of a change in the pivot period of the tilt of the mirror.

FIG. 11 is a graph illustrating one example of a change in one period of pivoting of the tilt of the light-transmitting mirror 141, the tilt of the light-receiving mirror 142, and the tilt shift in a configuration where an intentional tilt shift is provided between the light-transmitting mirror 141 and the light-receiving mirror 142. Compared to FIG. 9, the tilt shift is shifted so as to become 0 at the small-opening end of the pivot range.

Figure 12:
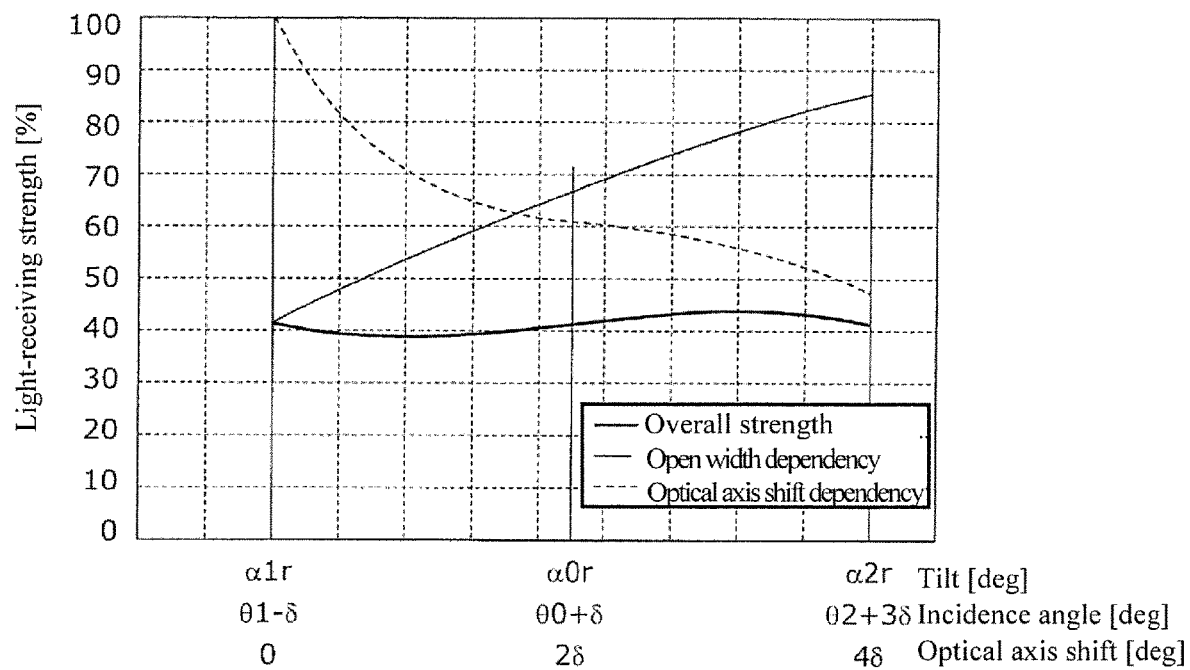
FIG. 12 is a graph illustrating one example of a light-receiving strength relative to the tilt of the light-receiving mirror.

FIG. 12 is a graph conceptually illustrating one example of the dependency of the light-receiving strength on the tilt of the light-receiving mirror 142. "Tilt," "incidence angle," and "optical axis shift" of the horizontal axis are respectively the tilt of the light-receiving mirror 142, the incidence angle of the returning light 161 to the light-receiving mirror 142, and the shift amount between the optical axis of the returning light 161, heading from the light-receiving mirror 142 to the light-receiving element 160, and the optical axis 162 of the light-receiving element 160 and illustrate an association conforming to the illustrations in FIG. 10A, FIG. 10B, and FIG. 10C.

"Opening-width dependency" indicates the opening width corresponding to the incidence angle. The opening width of the light-receiving mirror 142 has a positive correlation with the tilt of the light-receiving mirror 142.

"Shift-amount dependency" indicates a ratio of light-receiving strength attenuated because of light-receiving loss arising according to the shift amount between the optical axis of the returning light 161, heading from the light-receiving mirror 142 to the light-receiving element 160, and the optical axis 162 of the light-receiving element 160. The light-receiving loss according to the optical-axis shift includes a condensing error and the deviation from the condenser lens 152 of a portion of the returning light 161 and is greater the greater the shift amount.

"Overall strength" indicates a product of the opening-width dependency and the shift-amount dependency. With the overall strength, by multiplying the opening-width dependency and the shift-amount dependency, which respectively have a positive and a negative correlation with tilt, variation relative to the tilt of the light-receiving mirror 142 (that is, the direction of the object) is suppressed.

The angle $\delta$ by which the light-receiving mirror 142 is shifted from the light-transmitting mirror 141 does not need to be strictly equal to the half amount of the difference between the pivot amplitude of the light-receiving mirror 142 and the pivot amplitude of the light-transmitting mirror 141 and is sufficient if it is an angle in the direction in which the opening width of the light-receiving mirror 142 increases.

According to this configuration, the light-receiving mirror 142 reflects the returning light 161 to the direction of the light-receiving element 160 when the pivoting light-receiving mirror 142 is in a position tilted a certain extent from the pivot center to the small-opening end.

As a result, at the small-opening end of the pivot range of the light-receiving mirror 142, the shift amount between the optical axis of the returning light 161, heading from the light-receiving mirror 142 to the light-receiving element 160, and the optical axis 162 of the light-receiving element 160 shrinks a certain extent. As a result, uniformity of ranging precision of the direction of the object can be improved a certain extent.

Second Example

In one or more embodiments of the first example of the present invention, uniformity of ranging precision of the direction of the object is improved by a characteristic disposition of the light source 120, the light-transmitting mirror 141, the light-receiving mirror 142, and the light-receiving element 160. This disposition is one where when the light-transmitting mirror 141 and the light-receiving mirror 142 are at rest the light-receiving mirror 142 reflects the returning light 161 in the direction tilted from the direction of the light-receiving element 160 to the direction in which the opening width increases.

In one or more embodiments of a second example of the present invention, another specific example of such a disposition is described.

One example of the measuring apparatus 100 having the disposition according to one or more embodiments of the second example of the present invention is described below.

Figure 13A:
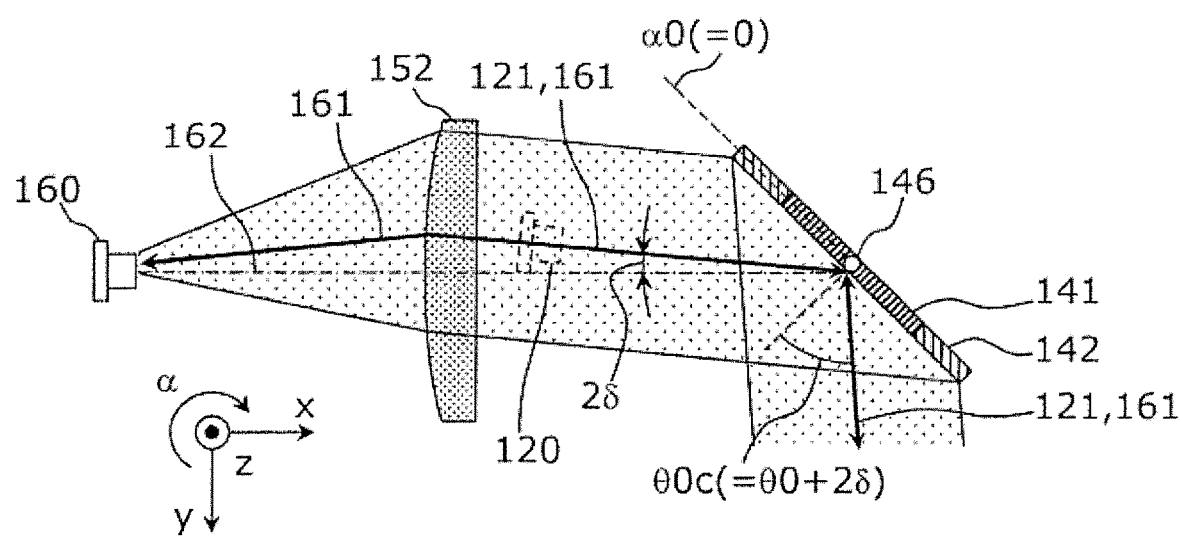
FIG. 13A is a diagram schematically illustrating one example of a disposition of an optical system according to one or more embodiments of a second example of the present invention.
Figure 13B:
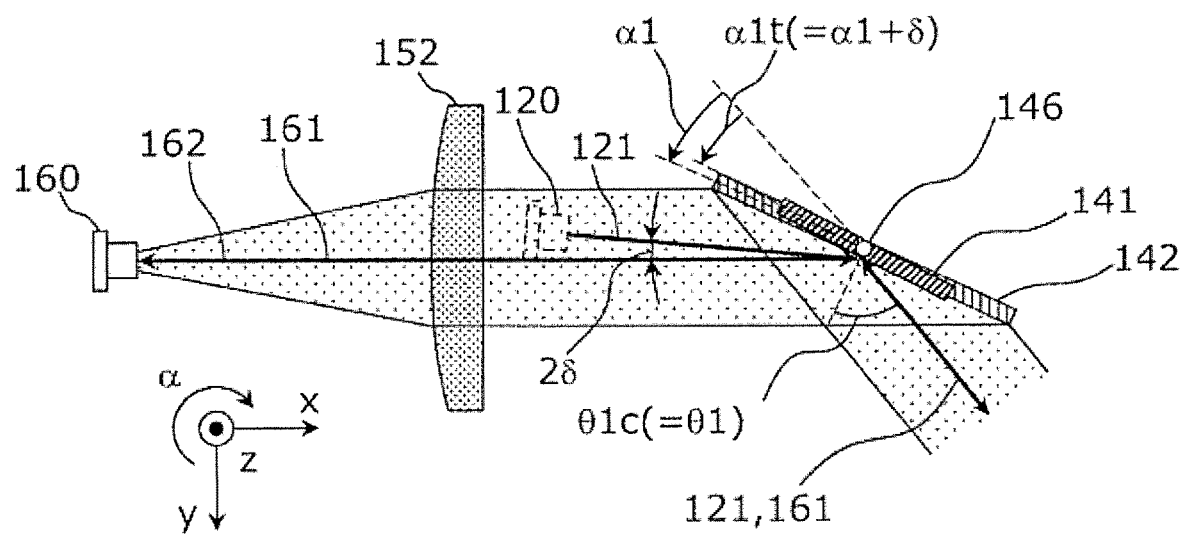
FIG. 13B is a diagram schematically illustrating one example of the disposition of the optical system according to one or more embodiments of the second example of the present invention.
Figure 13C:
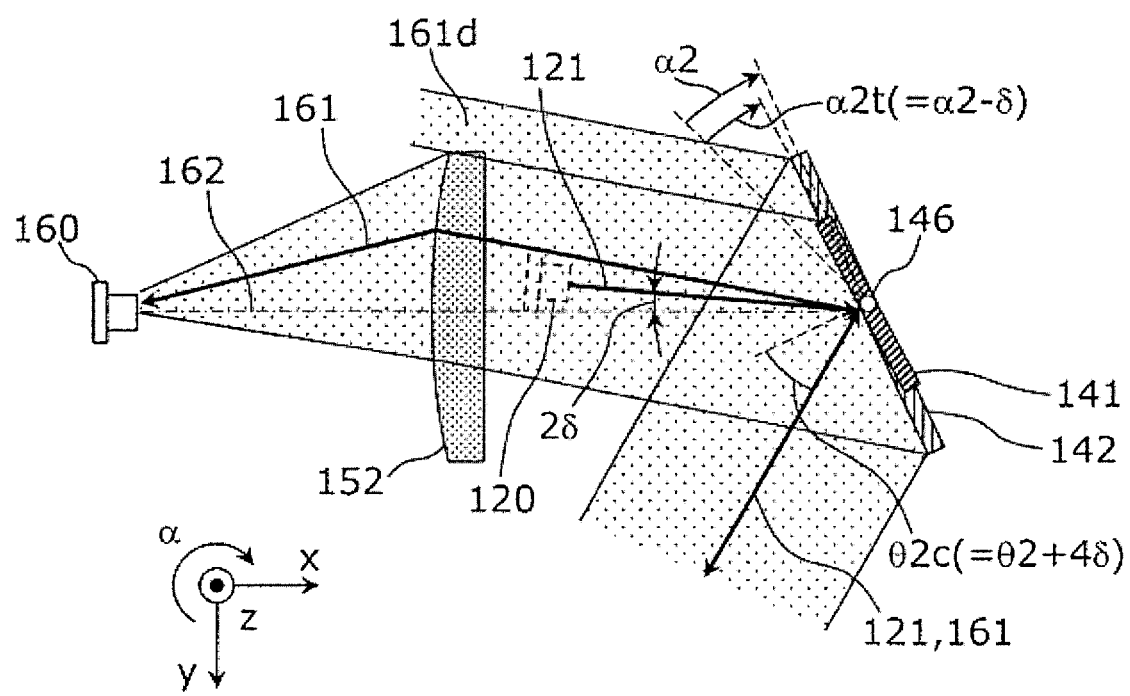
FIG. 13C is a diagram schematically illustrating one example of the disposition of the optical system according to one or more embodiments of the second example of the present invention.

FIG. 13A, FIG. 13B, and FIG. 13C are respectively diagrams schematically illustrating one actual example of the path of the returning light 161 that arrives at the light-receiving element 160 when the light-receiving mirror 142 is at the center, the small-opening end, and the large-opening end of the pivot range viewed from the direction of the pivot shaft 146 (z-axis direction).

The disposition in FIG. 13A is the same as the disposition where the light-transmitting mirror 141 and the light-receiving mirror 142 are at rest. The disposition in FIG. 13A differs from the disposition in FIG. 10A in that the mirror surface of the light-transmitting mirror 141 and the mirror surface of the light-receiving mirror 142 at rest are parallel and the light source 120 is disposed around the pivot shaft 146 tilted from the direction of the light-receiving element 160 to the direction in which the opening width of the light-receiving mirror 142 increases. In other words, a mirror angle (first mirror angle) between a mirror surface of the light-receiving mirror 160 (or light-transmitting mirror 141) and a direction from the pivot shaft 146 to the light-receiving element 160 may be larger than a mirror angle between the mirror surface of the light-receiving mirror 160 (or light-transmitting mirror 141) and a direction from the pivot shaft 146 to the light source 120.

Similarly to FIG. 10A, the pivot amplitude of the light-transmitting mirror 141 is described below as $2\delta$ less than the pivot amplitude of the light-receiving mirror 142.

In the optical system illustrated in FIG. 13A, the light source 120 is intentionally disposed around the pivot shaft 146 tilted by the angle $2\delta$ from the direction of the light-receiving element 160 to a rotational direction in which the opening width increases.

According to this disposition, the optical axis of the returning light 161 heading from the light-receiving mirror 142 to the light-receiving element 160, compared to the situation where no intentional shift is provided between the optical axis of the light source 120 and the optical axis 162 of the light-receiving element 160, tilts by the angle $2\delta$ in the direction in which the opening width of the light-receiving mirror 142 increases.

As a result, the shift amount between the optical axis of the returning light 161, heading from the light-receiving mirror 142 to the light-receiving element 160, and the optical axis 162 of the light-receiving element 160 shrinks at the small-opening end of the pivot range of the light-receiving mirror 142 and enlarges at the large-opening end. As a result, reduction of the light-receiving strength when the light-receiving mirror 142 is at the small-opening end of the pivot range is mitigated; therefore, uniformity of ranging precision of the direction of the object improves.

The angle $2\delta$ by which the optical axis of the light source 120 is shifted from the optical axis 162 of the light-receiving element 160 may be equal to a difference amount between the pivot amplitude of the light-receiving mirror 142 and the pivot amplitude of the light-transmitting mirror 141.

According to this disposition, as illustrated in FIG. 13B, the light-receiving mirror 142 reflects the returning light 161 to the direction of the light-receiving element 160 when at the small-opening end of the pivot range.

As a result, at the small-opening end, reduction of the light-receiving strength due to the shift between the optical axis of the returning light 161 and the optical axis 162 of the light-receiving element 160 is eliminated; therefore, uniformity of ranging precision of the direction of the object improves.

Furthermore, as illustrated in FIG. 13C, when the light-receiving mirror 142 is at the large-opening end of the pivot range, of the returning light 161 heading from the light-receiving mirror 142 to the light-receiving element 160, the luminous flux 161d that deviates from the condenser lens 152 increases more than the situation where no intentional shift is provided.

As a result, the light-receiving strength when the light-receiving mirror 142 is at the large-opening end of the pivot range can be reduced more effectively; therefore, uniformity of ranging precision of the direction of the object improves.

Figure 14:
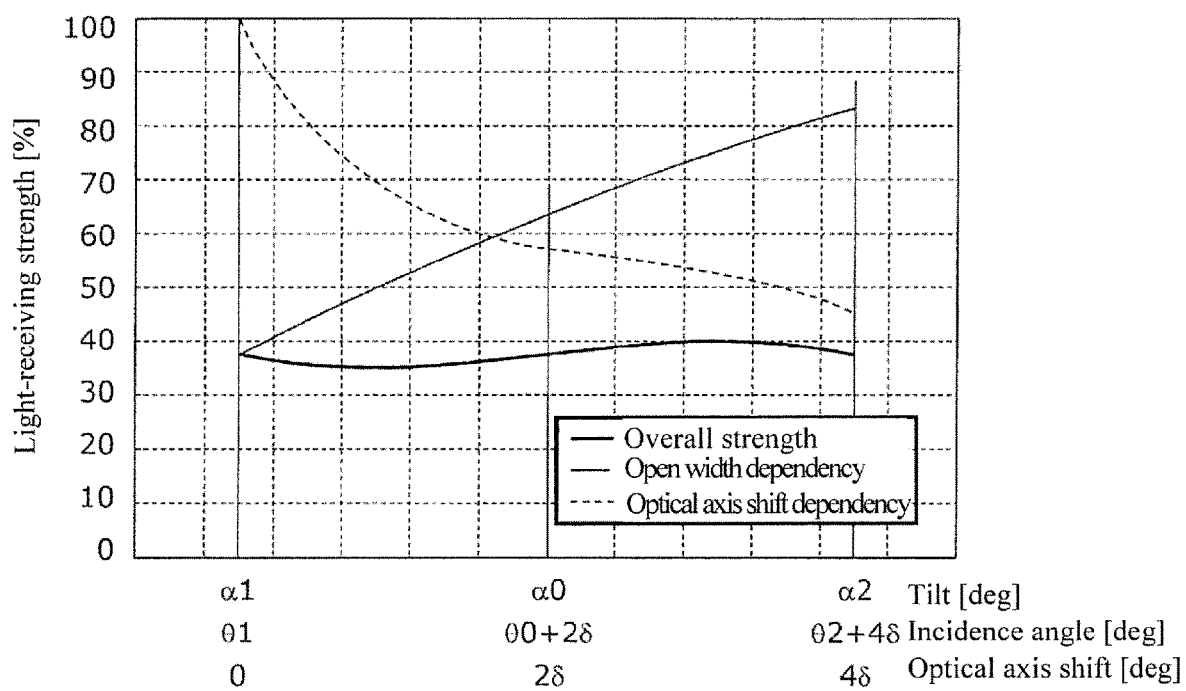
FIG. 14 is a graph illustrating one example of the light-receiving strength relative to the tilt of the light-receiving mirror.

FIG. 14 is a graph conceptually illustrating one example of the dependency of the light-receiving strength on the tilt of the light-receiving mirror 142. "Tilt," "incidence angle," and "optical axis shift" of the horizontal axis are respectively the tilt of the light-receiving mirror 142, the incidence angle of the returning light 161 to the light-receiving mirror 142, and the shift amount between the optical axis of the returning light 161, heading from the light-receiving mirror 142 to the light-receiving element 160, and the optical axis 162 of the light-receiving element 160 and illustrate an association conforming to the illustrations in FIG. 13A, FIG. 13B, and FIG. 13C.

"Opening-width dependency" indicates the opening width corresponding to the incidence angle. The opening width of the light-receiving mirror 142 has a positive correlation with the tilt of the light-receiving mirror 142.

"Shift-amount dependency" indicates the ratio of the light-receiving strength attenuated because of the light-receiving loss arising according to the shift amount between the optical axis of the returning light 161, heading from the light-receiving mirror 142 to the light-receiving element 160, and the optical axis 162 of the light-receiving element 160. The light-receiving loss according to the optical-axis shift includes the condensing error and the deviation from the condenser lens 152 of a portion of the returning light 161 and is greater the greater the shift amount.

"Overall strength" indicates the product of the opening-width dependency and the shift-amount dependency. With the overall strength, by multiplying the opening-width dependency and the shift-amount dependency, which respectively have the positive and the negative correlation with tilt, variation relative to the tilt of the light-receiving mirror 142 (that is, the direction of the object) is suppressed.

The angle 2δ by which the optical axis of the light source 120 is shifted from the optical axis 162 of the light-receiving element 160 does not need to be strictly equal to the difference amount between the pivot amplitude of the light-receiving mirror 142 and the pivot amplitude of the light-transmitting mirror 141 and is sufficient if it is an angle in the direction in which the opening width of the light-receiving mirror 142 increases.

According to this configuration, the light-receiving mirror 142 reflects the returning light 161 to the direction of the light-receiving element 160 when the pivoting light-receiving mirror 142 is in the position tilted a certain extent from the pivot center to the small-opening end.

As a result, at the small-opening end of the pivot range of the light-receiving mirror 142, the shift amount between the optical axis of the returning light 161, heading from the light-receiving mirror 142 to the light-receiving element 160, and the optical axis 162 of the light-receiving element 160 shrinks a certain extent. As a result, uniformity of ranging precision of the direction of the object can be improved a certain extent.

Third Example

In one or more embodiments of a third example of the present invention, one example of another configuration of the mirror is described.

Figure 15:
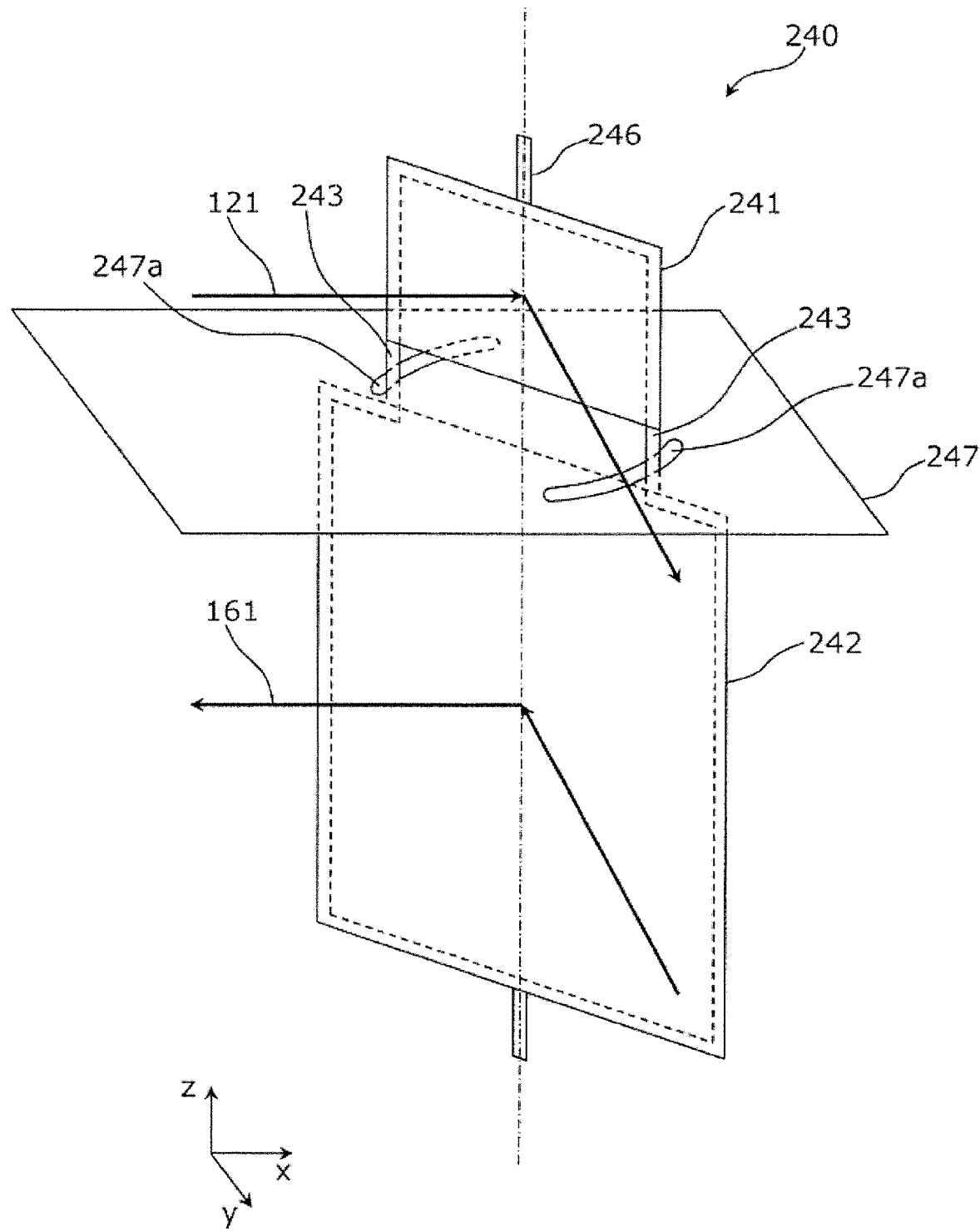
FIG. 15 is a perspective view illustrating one example of a configuration of a mirror according to one or more embodiments of a third example of the present invention.

FIG. 15 is a perspective view illustrating one example of a configuration of a mirror 240 according to one or more embodiments of the third example of the present invention. As illustrated in FIG. 15, the mirror 240 includes a light-transmitting mirror 241 and a light-receiving mirror 242 supported by a pivot shaft 246. The mirror 240 differs from the mirror 140 in FIG. 4 in that the light-transmitting mirror 241 and the light-receiving mirror 242 are connected by two connecting shafts 243 separated in a direction orthogonal to the pivot shaft 246.

As one example, the mirror 240 is configured affixing respective reverse surfaces (opposite surfaces of reflective surfaces) of the light-transmitting mirror 241 and the light-receiving mirror 242 on the pivot shaft 246, which is frame-like.

The light-transmitting mirror 241 and the light-receiving mirror 242 are, for example, metal-film mirrors. The pivot shaft 246 is formed by, for example, punching out sheet metal. The connecting shafts 243 may be a portion connected to the pivot shaft 246 punched out from the same sheet metal. A shape of an opening 247a of a shading plate 247 is changed to adapt to the connecting shaft 243.

The connecting shafts connecting the light-transmitting mirror 241 and the light-receiving mirror 242 having a small cross-sectional area as in a single shaft may be advantageous to suppress stray light; however, as illustrated in FIG. 15, even in a situation where a configuration is with a plurality of connecting shafts 243, by applying the configurations described in one or more embodiments of the first and second examples of the present invention, an effect of improving uniformity of ranging precision of the direction of the object can be obtained.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATION OF REFERENCES

100 Measuring apparatus (position detecting apparatus)
101 Light-sending region
102 Light-receiving region
110 Housing
111 Light-sending window
112 Light-receiving window
120 Light source
121 Measuring light
130 Optical light transmitter
132 Collimator lens
140, 240 Mirror
141, 241 Light-transmitting mirror
142, 242 Light-receiving mirror
146, 246 Pivot shaft
147, 247 Shading plate
150 Optical light receiver
152 Condenser lens
160 Light-receiving element
161 Returning light
161a, 161b, 161c, 161d Luminous flux
162 Optical axis
164 Pivot shaft
170 Light-source driver
180 Mirror driver
190 Controller 243 Connecting shaft
247a Opening
901 Object

What is claimed is:
1. A position detecting apparatus comprising:
a light-transmitting mirror that pivots around a pivot shaft and reflects measuring light from a light source;
a light-receiving mirror that pivots around the pivot shaft and reflects returning light from an object; and
a light-receiving element that receives the returning light from the light-receiving mirror, wherein
a first minor angle between a mirror surface of the light-receiving mirror and a direction from the pivot shaft to the light-receiving element is larger than a second minor angle between a mirror surface of the light-transmitting mirror and the direction, and
the mirror surface of the light-receiving mirror is tilted from the mirror surface of the light-transmitting mirror by an angle equal to half of a difference between a pivot amplitude of the light-receiving mirror and a pivot amplitude of the light-transmitting mirror.

2. The position detecting apparatus according to claim 1, wherein the pivot shaft, the light source, and the light-receiving element are disposed along a same line in a direction perpendicular to the pivot shaft.

3. The position detecting apparatus according to claim 1, further comprising:
a condenser lens between the light-receiving mirror and the light-receiving element, wherein
when the light-receiving mirror is at an end of a pivot range of the light-receiving mirror in a rotational direction in which the first minor angle increases, a luminous flux of a portion of the returning light deviates from the condenser lens.

4. The position detecting apparatus according to claim 1, wherein the light-receiving mirror and the light-transmitting mirror are connected by two connecting shafts separated in a direction perpendicular to the pivot shaft.

5. The position detecting apparatus according to claim 1, wherein the light-receiving mirror and the light-transmitting mirror are metal-film mirrors.

6. The position detecting apparatus according to claim 1, further comprising:
a controller that calculates a distance from the position detecting apparatus to the object based on a phase difference between the light emitted from the light source and the returning light received by the light-receiving element.

7. A position detecting comprising:
a light-transmitting mirror that pivots around a pivot shaft and reflects measuring light from a light source;
a light-receiving mirror that pivots around the pivot shaft and reflects returning light from an object; and
a light-receiving element that receives the returning light from the light-receiving mirror, wherein
a mirror surface of the light-receiving mirror and a mirror surface of the light-transmitting mirror are parallel,
a first minor angle between a mirror surface of the light-receiving mirror and a direction from the pivot shaft to the light-receiving element is larger than a minor angle between the mirror surface of the light-receiving mirror and a direction from the pivot shaft to the light source, and
the mirror surface of the light-receiving mirror is tilted from the mirror surface of the light-transmitting mirror by an angle equal to a half amount of a difference between a pivot amplitude of the light-receiving mirror and a pivot amplitude of the light-transmitting mirror.

8. The position detecting apparatus according to claim 7, further comprising:
a condenser lens between the light-receiving mirror and the light-receiving element, wherein
when the light-receiving mirror is at an end of a pivot range of the light-receiving mirror in a rotational direction in which the first minor angle increases, a luminous flux of a portion of the returning light deviates from the condenser lens.

9. The position detecting apparatus according to claim 7, wherein the light-receiving mirror and the light-transmitting mirror are connected by two connecting shafts separated in a direction perpendicular to the pivot shaft.

10. A measuring method for measuring a distance from a position detecting apparatus to an object, the measuring method comprising:
reflecting, with a light-transmitting mirror, measuring light from a light source;
receiving, with a light-receiving mirror, returning light from an object incident and parallel to the measuring light reflected from the light-transmitting mirror;
reflecting to a first direction, with the light-receiving mirror, the returning light incident in a parallel manner to the measuring light reflected from the light-transmitting mirror; and
receiving, with a light-receiving element, the returning light, wherein
the first direction is tilted in a rotational direction in which a minor angle between the first direction and a second direction from the pivot shaft to a light-receiving element increases, and
wherein the light source and the light-receiving element are disposed around the pivot shaft tilted by an angle equal to a difference between a pivot amplitude of the light-receiving mirror and a pivot amplitude of the light-transmitting mirror.

11. The measuring method according to claim 10, wherein while the light-transmitting mirror and the light-receiving mirror pivot, the reflecting, with the light-receiving mirror, in a position tilted from a pivot center to the rotational direction in which the minor angle decreases, reflects the returning light incident and parallel to the measuring light reflected from the light-transmitting mirror, to the second direction.

12. The measuring method according to claim 11, wherein the light-receiving mirror, at an end of a pivot range of the light-receiving mirror in the rotational direction in which the minor angle decreases, reflects the returning light incident and parallel to the measuring light reflected from the light-transmitting mirror, to the second direction.

13. The measuring method according to claim 10, wherein the light source is disposed on the second direction, and
when the light-transmitting mirror and the light-receiving mirror are at rest, a mirror surface of the light-receiving mirror is tilted from a mirror surface of the light-transmitting mirror to the rotational direction in which the minor angle increases.

14. The measuring method according to claim 10, wherein the light source is disposed around the pivot shaft tilted from the direction of the light-receiving element to the rotational direction in which the minor angle increases, and when the light-transmitting mirror and the light-receiving mirror are at rest, a mirror surface of the light-receiving mirror and a mirror surface of the light-transmitting mirror are parallel.

15. The measuring method according to claim 14, wherein the light source and the light-receiving element are disposed around the pivot shaft tilted by an angle equal to a difference between a pivot amplitude of the light-receiving mirror and a pivot amplitude of the light-transmitting mirror.

16. The measuring method according to claim 10, further comprising:
   a condenser lens between the light-receiving mirror and the light-receiving element, wherein
   when the light-receiving mirror is at an end of a pivot range of the light-receiving mirror in the rotational direction in which the minor angle increases, a luminous flux of a portion of the returning light deviates from the condenser lens.

17. The measuring method according to claim 10, wherein the light-receiving mirror and the light-transmitting mirror are connected by two connecting shafts separated in a direction perpendicular to the pivot shaft.

\* \* \* \* \*